(12) United States Patent
Xue et al.

(10) Patent No.: US 11,329,686 B2
(45) Date of Patent: May 10, 2022

(54) SIGNAL TRANSCEIVER APPARATUS AND BASE STATION

(71) Applicant: Huawei Technologies Co., Ltd., Shenzhen (CN)

(72) Inventors: Yusheng Xue, Shenzhen (CN); Haiqiang Sheng, Segrate (IT); Meiqing Qi, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 197 days.

(21) Appl. No.: 15/931,231

(22) Filed: May 13, 2020

(65) Prior Publication Data

US 2020/0274574 A1 Aug. 27, 2020

Related U.S. Application Data

(63) Continuation of application No. PCT/CN2018/092334, filed on Jun. 22, 2018.

(30) Foreign Application Priority Data

Nov. 15, 2017 (CN) .......................... 201711132017.2

(51) Int. Cl.
*H01Q 1/24* (2006.01)
*H01Q 1/52* (2006.01)
(Continued)

(52) U.S. Cl.
CPC ................. *H04B 1/40* (2013.01); *H01Q 1/24* (2013.01); *H01Q 1/52* (2013.01); *H01Q 1/526* (2013.01);
(Continued)

(58) Field of Classification Search
CPC ...... H01Q 1/24; H01Q 1/526; H01Q 21/0037; H01Q 21/005; H01Q 21/00; H01Q 1/52; H04B 1/40; H04B 1/036; H04B 1/38
(Continued)

(56) References Cited

U.S. PATENT DOCUMENTS

| 4,862,186 A | 8/1989 | Strider |
| 5,426,442 A * | 6/1995 | Haas ................... H01Q 13/0208 343/772 |

(Continued)

FOREIGN PATENT DOCUMENTS

| CN | 102195111 A | 9/2011 |
| CN | 102738585 A | 10/2012 |

(Continued)

*Primary Examiner* — Hai V Tran
(74) *Attorney, Agent, or Firm* — Conley Rose, P.C.

(57) ABSTRACT

A signal transceiver apparatus includes at least one plug-in card and a backplane. The plug-in card includes two waveguide boards, a multi-layer circuit board disposed between the two waveguide boards, and an antenna array and a first waveguide interface that are mounted on each of the two waveguide boards. A waveguide slot is provided on one side, facing the multi-layer circuit board, of each of the two waveguide boards. A metal layer corresponding to the waveguide slot is disposed on each of two sides of the multi-layer circuit board, wherein the metal layers and the waveguide slots cooperate to form two waveguide channels that are respectively located on two sides of the multi-layer circuit board and that each are connected to the antenna array and the first waveguide interface.

20 Claims, 19 Drawing Sheets

(51) Int. Cl.
*H01Q 21/00* (2006.01)
*H04B 1/40* (2015.01)
*H04B 1/036* (2006.01)
*H04B 1/38* (2015.01)

(52) U.S. Cl.
CPC ......... *H01Q 21/00* (2013.01); *H01Q 21/0037* (2013.01); *H01Q 21/005* (2013.01); *H04B 1/036* (2013.01); *H04B 1/38* (2013.01)

(58) Field of Classification Search
USPC ........................................................ 343/702
See application file for complete search history.

(56) References Cited

U.S. PATENT DOCUMENTS

| | | | | |
|---|---|---|---|---|
| 6,008,763 | A * | 12/1999 | Nystrom | H01Q 9/0457 343/700 MS |
| 6,703,976 | B2 * | 3/2004 | Jacomb-Hood | H01Q 1/288 342/373 |
| 2005/0134514 | A1 * | 6/2005 | Navarro | H01Q 21/0025 343/772 |
| 2011/0194240 | A1 * | 8/2011 | Hansen | H01P 3/081 361/679.28 |

FOREIGN PATENT DOCUMENTS

| | | |
|---|---|---|
| CN | 202930551 U | 5/2013 |
| CN | 103715522 A | 4/2014 |
| CN | 105790860 A | 7/2016 |
| CN | 106356612 A | 1/2017 |
| CN | 106487450 A | 3/2017 |
| CN | 107230836 A | 10/2017 |
| EP | 2234283 A1 | 9/2010 |
| GB | 1535954 A | 12/1978 |
| WO | 2017052648 A1 | 3/2017 |

* cited by examiner (a)  (b)  (c)

SIGNAL TRANSCEIVER APPARATUS AND BASE STATION

CROSS-REFERENCE TO RELATED APPLICATIONS

This application is a continuation of International Patent Application No. PCT/CN2018/092334, filed on Jun. 22, 2018, which claims priority to Chinese Patent Application No. 201711132017.2, filed on Nov. 15, 2017. The disclosures of the aforementioned applications are hereby incorporated by reference in their entireties.

TECHNICAL FIELD

This application relates to the field of communications technologies, and in particular, to a signal transceiver apparatus and a base station.

BACKGROUND

In recent years, mobile communications technologies rapidly develop and are widely used. In a 5th-generation (5G) mobile communications system, a base station includes a baseband unit (BBU), a transceiver unit, and an antenna feeder unit. Currently, in a wireless communications base station product, the BBU is usually made into a BBU module, and the transceiver unit and the antenna feeder unit are made into a remote radio unit (RRU) modules. To achieve lower costs, a smaller volume, and higher conversion efficiency and to support more flexible array configuration, it is very important to select a proper RRU physical implementation architecture.

Currently, a common RRU physical implementation architecture exists. FIG. 1 is a logical block diagram of an architecture including a backplane and a transceiver plug-in card in other approaches. As shown in the figure, in the RRU physical implementation architecture, a digital backplane and a transceiver (TRX) plug-in card are used, common units in a TRX circuit are made into a digital backplane, and a single or (two) standalone units in the TRX circuit are made into a plug-in card module (plug-in cards 1, 2, . . . n in FIG. 1). The antenna feeder unit is obtained by assembling a plurality of plug-in card modules, and a size of an antenna array can be adjusted by configuring the plug-in cards. The plug-in cards and the backplane can be connected using a connecting part such as a high-speed digital connector or a radio frequency coaxial connector.

In a multi-column antenna scenario, a plurality of suites of connecting parts should be used. For example, when an eight-column antenna is needed, eight suites of connecting parts are used. A large quantity of connecting parts are needed in a scenario of a large array antenna, and a quantity of plug-in cards increases accordingly, and consequently space utilization of the RRU is reduced. In addition, the large quantity of plug-in cards hinders heat dissipation of the RRU.

SUMMARY

This application provides a signal transceiver apparatus and a base station such that a degree of integration of a waveguide structure can be improved, and a quantity of plug-in cards can also be reduced when antennas have a same array scale, thereby improving space utilization of the signal transceiver apparatus and facilitating heat dissipation of the signal transceiver apparatus.

According to a first aspect of embodiments of this application, a signal transceiver apparatus is provided. The signal transceiver apparatus may be applied to scenarios such as a radio frequency module of a wireless high-frequency base station and an outdoor module of a wireless backhaul device. In these scenarios, a front-end circuit and an antenna feeder unit operate in a microwave frequency band, and a waveguide solution is usually used for signal transmission and connection.

First, a plug-in card of the signal transceiver apparatus is introduced. The plug-in card includes two waveguide boards, a multi-layer circuit board disposed between the two waveguide boards, and an antenna array and a first waveguide interface that are mounted on each of the two waveguide boards. A waveguide slot is provided on one side, facing the multi-layer circuit board, of each of the two waveguide boards. Correspondingly, a metal layer that matches the waveguide slot is disposed on each of two sides of the multi-layer circuit board, and the metal layer may be provided with copper foil. The so-called "matching" means that the metal layers and the waveguide slots cooperate to form two waveguide channels that are respectively located on two sides of the multi-layer circuit board and that each are connected to the antenna array and the first waveguide interface.

Next, a backplane of the signal transceiver apparatus is introduced. A second waveguide interface that matches the first waveguide interface is mainly disposed on the backplane such that waveguide connection between the plug-in card and the backplane may be implemented through interconnection between the first waveguide interface and the second waveguide interface.

It can be learned that, with the foregoing structure, two waveguide channels can be formed using the two waveguide boards and the multi-layer circuit board, and each waveguide channel is connected to one antenna array such that a degree of integration of a waveguide structure is improved, and a quantity of plug-in cards is reduced in a scenario in which antennas having a same array scale are needed, thereby improving space utilization of the signal transceiver apparatus and facilitating heat dissipation of the signal transceiver apparatus.

In a possible design, according to a first implementation of the first aspect of the embodiments of this application, a punched hole is further disposed on the multi-layer circuit board of the signal transceiver apparatus, and the punched hole connects the two waveguide channels located on two sides of the multi-layer circuit board. It needs to be noted that a shape of the punched hole may be a cube, or a cylinder, or a solid of another shape, and this is not limited herein.

It can be learned that the waveguide channels can be associated after the punched hole is formed in the multi-layer circuit board, thereby giving way to some circuit layouts and wiring on the multi-layer circuit board, and making waveguide transmission more flexible.

In a possible design, according to a second implementation of the first aspect of the embodiments of this application, at least one cross groove is provided at the metal layer of the signal transceiver apparatus, and the at least one cross groove passes through the metal layer on the two sides of the multi-layer circuit board. There may be two cross grooves. The two cross grooves are both located on a diagonal line of the multi-layer circuit board. The diagonal line is a line segment formed after two opposite angles in an overlapping area of the two waveguide channels are connected. Because the overlapping area of the two waveguide channels is usually a rectangle, there are two diagonal lines. Assuming that the two diagonal lines are a diagonal line A and a diagonal line B respectively, the two cross grooves are either on the diagonal line A or on the diagonal line B.

It can be learned that, by forming two cross grooves in the multi-layer circuit board, a signal in a waveguide on one side can be coupled to a waveguide on the other side through the multi-layer circuit board such that an antenna can be calibrated and tested, and the calibration and the test can be performed as long as 1% of energy is coupled.

In a possible design, according to a third implementation of the first aspect of the embodiments of this application, the plug-in card of the signal transceiver apparatus may further include a front-end circuit disposed on the multi-layer circuit board. The front-end circuit is directly connected to the antenna array using the waveguide channels, and the front-end circuit is mainly configured to amplify a radio frequency signal received or sent by the antenna array.

It can be learned that plug-in card integration can be implemented, provided that merely the front-end circuit for radio frequency signal processing is disposed in the plug-in card, thereby reducing a volume of the plug-in card.

In a possible design, according to a fourth implementation of the first aspect of the embodiments of this application, the front-end circuit of the signal transceiver apparatus further includes a low-noise amplifier (LNA) and a power amplifier (PA). The LNA is mainly configured to perform low-noise amplification on a radio frequency signal received by the antenna array. The PA is mainly configured to perform power amplification on the radio frequency signal, and send the power-amplified radio frequency signal on which power amplification is performed to the antenna array.

It can be learned that, by merely making the LNA, the PA, and the antenna array into a plug-in card, heat density of the plug-in card can be effectively lowered. When output power is the same, a solution of natural heat dissipation may be used, with relatively high reliability and corresponding lower costs in future maintenance of the plug-in card.

In a possible design, according to a fifth implementation of the first aspect of the embodiments of this application, the two waveguide boards of the signal transceiver apparatus may be connected to a grounding plane of the multi-layer circuit board, and the two waveguide boards are configured to shield the front-end circuit from an interference signal.

It can be learned that the plug-in card can also shield, using the two waveguide boards, a radio frequency signal from interference of external signals, thereby improving reliability of radio frequency signal transmission.

In a possible design, according to a sixth implementation of the first aspect of the embodiments of this application, a pad connecting to the front-end circuit is mounted on the multi-layer circuit board of the signal transceiver apparatus. The pad is mounted in a tin-soldering manner on the multi-layer circuit board. In addition, a heat conduction via passing through the multi-layer circuit board is further provided on the multi-layer circuit board. The pad is connected to one of the two waveguide boards using the heat conduction via. In this case, heat may be conducted from the pad to the heat conduction via and then conducted to the waveguide board.

It can be learned that an objective of heat dissipation can be achieved for the front-end circuit using the heat conduction via formed in the multi-layer circuit board, thereby achieving an effect of heat dissipation of the plug-in card.

In a possible design, according to a seventh implementation of the first aspect of the embodiments of this application, the front-end circuit of the signal transceiver apparatus is connected to the waveguide channels using a waveguide conversion section. The waveguide conversion section is a substrate integrated waveguide. A microstrip is first converted to the substrate integrated waveguide, and then the substrate integrated waveguide is converted to a waveguide.

It can be learned that, because a wavelength of a high-frequency wave is excessively short, the microstrip often fails if a tolerance requirement is excessively high. Although a waveguide is commonly used in a high-frequency case, the waveguide has a large volume and can hardly be integrated, therefore, a waveguide conversion section, which has merits of both a conventional waveguide and a microstrip transmission line, may be used to implement a high-performance microwave or millimeter-wave planar circuit.

In a possible design, according to an eighth implementation of the first aspect of the embodiments of this application, the antenna array of the signal transceiver apparatus further includes two antenna sub-arrays, the two antenna sub-arrays are mounted between the two waveguide boards, and the two antenna sub-arrays correspond to the waveguide channels.

It can be learned that the plug-in card further includes two antenna sub-arrays, and a quantity of the plug-in cards can be reduced when the antenna array is combined as required, thereby reducing costs of the plug-in cards and improving practicability of the signal transceiver apparatus.

In a possible design, according to a ninth implementation of the first aspect of the embodiments of this application, one of the two antenna sub-arrays of the signal transceiver apparatus is connected to a waveguide channel formed between one waveguide board and the multi-layer circuit board, and the other antenna sub-array is connected to a waveguide channel formed between the other waveguide board and the multi-layer circuit board. Certainly, in practical application, besides that the antenna array of the plug-in card includes two groups of antenna sub-arrays, the antenna array of the plug-in card may also include one group of antenna sub-arrays, or four groups of antenna sub-arrays, or the like.

It can be learned that the plug-in card may further integrate at least one antenna sub-array, thereby implementing flexible configuration of antenna sub-arrays, to help improve practicability of the signal transceiver apparatus.

In a possible design, according to a tenth implementation of the first aspect of the embodiments of this application, the first waveguide interface of the signal transceiver apparatus may include two groups of waveguide interfaces. Generally, one group of waveguide interfaces includes two waveguide interfaces. One of the two groups of waveguide interfaces of the first waveguide interface is disposed between one waveguide board and the multi-layer circuit board, in other words, located between one waveguide board and one side of the multi-layer circuit board. The other group of waveguide interfaces of the first waveguide interface is disposed between the other waveguide board and the other side of the multi-layer circuit board.

It can be learned that the first waveguide interface of the signal transceiver apparatus may include a plurality of waveguide interfaces configured to match the second waveguide interface, and radio frequency signal transmission between the plurality of waveguide interfaces can improve signal transmission efficiency.

In a possible design, according to an eleventh implementation of the first aspect of the embodiments of this application, both the first waveguide interface and the second waveguide interface of the signal transceiver apparatus may be rectangular waveguides. A rectangular waveguide is an important waveguide apparatus for transmitting electromagnetic waves using a metal tube. A wall of the tube is usually copper, aluminum or another metal material. The rectangular waveguide is characterized by a simple structure and high mechanical strength. There is no inner conductor inside the waveguide, loss of the waveguide is low, and power capacity of the waveguide is large. As electromagnetic energy is propagated, in a directed manner, in an internal space of a waveguide, electromagnetic wave leakage from the waveguide can be prevented.

Optionally, the first waveguide interface and the second waveguide interface may alternatively be ridged waveguides. Ridged waveguides are classified into single-ridge waveguides and double-ridge waveguides. A ridged waveguide may be considered as coming into being when a wide wall of a rectangular waveguide is bent. An electromagnetic field mode of a ridged waveguide is similar to an electromagnetic field mode of a rectangular waveguide. For this reason, a same mode name is used, except that field distribution is disturbed nearby a ridge due to an edge effect. Major parameters of a ridged waveguide include a main-mode cut-off wavelength, single-mode operating bandwidth of the ridged waveguide, characteristic impedance of the ridged waveguide, power capacity of the ridged waveguide, and attenuation of the ridged waveguide.

It can be learned that the first waveguide interface and the second waveguide interface have a relatively good energy propagation characteristic, a simple structure, and high mechanical strength, regardless of whether the first waveguide interface and the second waveguide interface use rectangular waveguides, single-ridge waveguides, or double-ridge waveguides. In addition, electromagnetic wave leakage from the inside can be prevented, thereby improving transmission reliability of the signal transceiver apparatus.

In a possible design, according to a twelfth implementation of the first aspect of the embodiments of this application, the backplane of the signal transceiver apparatus includes a radio frequency circuit and a digital intermediate frequency processing unit, one end of the digital intermediate frequency processing unit is connected to one end of the radio frequency circuit, and the other end of the digital intermediate frequency processing unit is connected to a BBU. The other end of the radio frequency circuit is connected to one end of the plug-in card. Further, the radio frequency circuit is mainly configured to perform down-conversion domain processing on a radio frequency signal to obtain an analog intermediate frequency signal, or perform up-conversion processing on an analog intermediate frequency signal to obtain a radio frequency signal. The digital intermediate frequency processing unit is mainly configured to convert an analog intermediate frequency signal into a digital intermediate frequency signal, or convert a digital intermediate frequency signal into an analog intermediate frequency signal.

It can be learned that a radio frequency circuit originally disposed in the plug-in card is disposed instead on the backplane, to better dissipate heat of the plug-in card, and the backplane has a larger heat dissipation area compared to the plug-in card, thereby facilitating heat dissipation, therefore, it is also practicable and feasible to allow the radio frequency circuit to be disposed on the backplane.

In a possible design, according to a thirteenth implementation of the first aspect of the embodiments of this application, the backplane of the signal transceiver apparatus may further include a shielding cover, a backplane multi-layer circuit board, and a heat dissipation device. The shielding cover is disposed on a first surface of the backplane multi-layer circuit board, the heat dissipation device is disposed on a second surface of the backplane multi-layer circuit board, and the first surface and the second surface are opposite.

In a general case, a top of the backplane multi-layer circuit board may be covered with a shielding cover. The shielding cover is made of metal, and is mainly configured to shield a radio frequency signal from interference of external signals, thereby improving reliability of radio frequency signal transmission. In addition, a heat dissipation device is disposed at a bottom of the backplane multi-layer circuit board. The heat dissipation device is mainly configured to conduct and release heat generated when the front-end circuit is operating, in other words, to dissipate heat of the backplane multi-layer circuit board.

It can be learned that, interference signal shielding can be implemented when the shielding cover is disposed, and heat of the backplane multi-layer circuit board can be dissipated using the heat dissipation device. In this way, heat dissipation and signal interference of the backplane are not affected due to integration of more circuits, thereby improving practicability of the solution.

In a possible design, according to a fourteenth implementation of the first aspect of the embodiments of this application, a waveguide choke groove is further designed on the backplane of the signal transceiver apparatus, and the waveguide choke groove is disposed on a periphery of the second waveguide interface.

It can be learned that radio frequency signal leakage probably to be caused by blind mate of waveguides may be further prevented when the waveguide choke groove is disposed on the backplane, thereby improving transmission reliability of the solution.

According to a second aspect of the embodiments of this application, a base station is provided. The base station can also be applied to scenarios of wireless high-frequency microwave access and microwave backhaul, and the base station includes any signal transceiver apparatus according to the first aspect, a BBU, and a transmission system. Major functions of the BBU are to modulate and demodulate data in order to restore subscriber's information. The BBU establishes a communication connection with the signal transceiver apparatus using the transmission system such that the BBU and the signal transceiver apparatus can communicate.

The base station using the signal transceiver apparatus provided in this application also has the technical effects brought by any design manner of the first aspect, and details are not described herein again.

It can be learned from the foregoing technical solutions that this application has the following advantages.

The embodiments of this application provide a signal transceiver apparatus, including at least one plug-in card and a backplane. The plug-in card includes two waveguide boards, a multi-layer circuit board disposed between the two waveguide boards, and an antenna array and a first waveguide interface that are mounted on each of the two waveguide boards. A waveguide channel connected to the antenna array and the first waveguide interface is formed between each of the two waveguide boards and the multi-layer circuit board. A second waveguide interface is disposed on the backplane. Waveguide connection between the plug-in card and the backplane is implemented through interconnection between the first waveguide interface and the second waveguide interface. With the foregoing structure, two waveguide channels may be formed using the two waveguide boards and the multi-layer circuit board, and each waveguide channel is connected to one antenna array such that a degree of integration of a waveguide structure can be improved, and a quantity of the plug-in cards is reduced in a scenario in which a same quantity of antennas is needed, thereby improving space utilization of the signal transceiver apparatus and facilitating heat dissipation of the signal transceiver apparatus.

DESCRIPTION OF EMBODIMENTS

This application provides a signal transceiver apparatus and a base station such that a degree of integration of a waveguide structure can be improved, and a quantity of plug-in cards can also be reduced in a scenario including a same quantity of antennas, thereby improving space utilization of a signal transceiver apparatus and facilitating heat dissipation of the signal transceiver apparatus.

In the specification, claims, and accompanying drawings of this application, the terms "first", "second", "third", "fourth", and so on (if any) are intended to distinguish between similar objects but do not necessarily indicate a specific order or sequence. It should be understood that the data termed in such a way is interchangeable in proper circumstances so that the embodiments of this application described herein can be implemented in other orders than the order illustrated or described herein. In addition, the terms "include", "contain" and any other variants mean to cover the non-exclusive inclusion, for example, a process, a method, a system, a product, or a device that includes a series of steps or units is not necessarily limited to those expressly listed steps or units, but may include other steps or units not expressly listed or inherent to the process, the method, the product, or the device.

It should be understood that the technical solutions of the embodiments of this application are mainly applied to scenarios of wireless high-frequency microwave access and microwave backhaul and various communications systems, such as a Global System for Mobile Communications (GSM) system, a code-division multiple access (CDMA) system, a wideband code-division multiple access (WCDMA) system, a General Packet Radio Service (GPRS) system, a Long-Term Evolution (LTE) system, an LTE frequency-division duplex (FDD) system, an LTE time-division duplex (TDD) system, a Universal Mobile Telecommunications System (UMTS), a Worldwide Interoperability for Microwave Access (WiMAX) communications system, or a 5G system. It should be noted that the embodiments of this application are not limited to a specific communications system.

Figure 1:
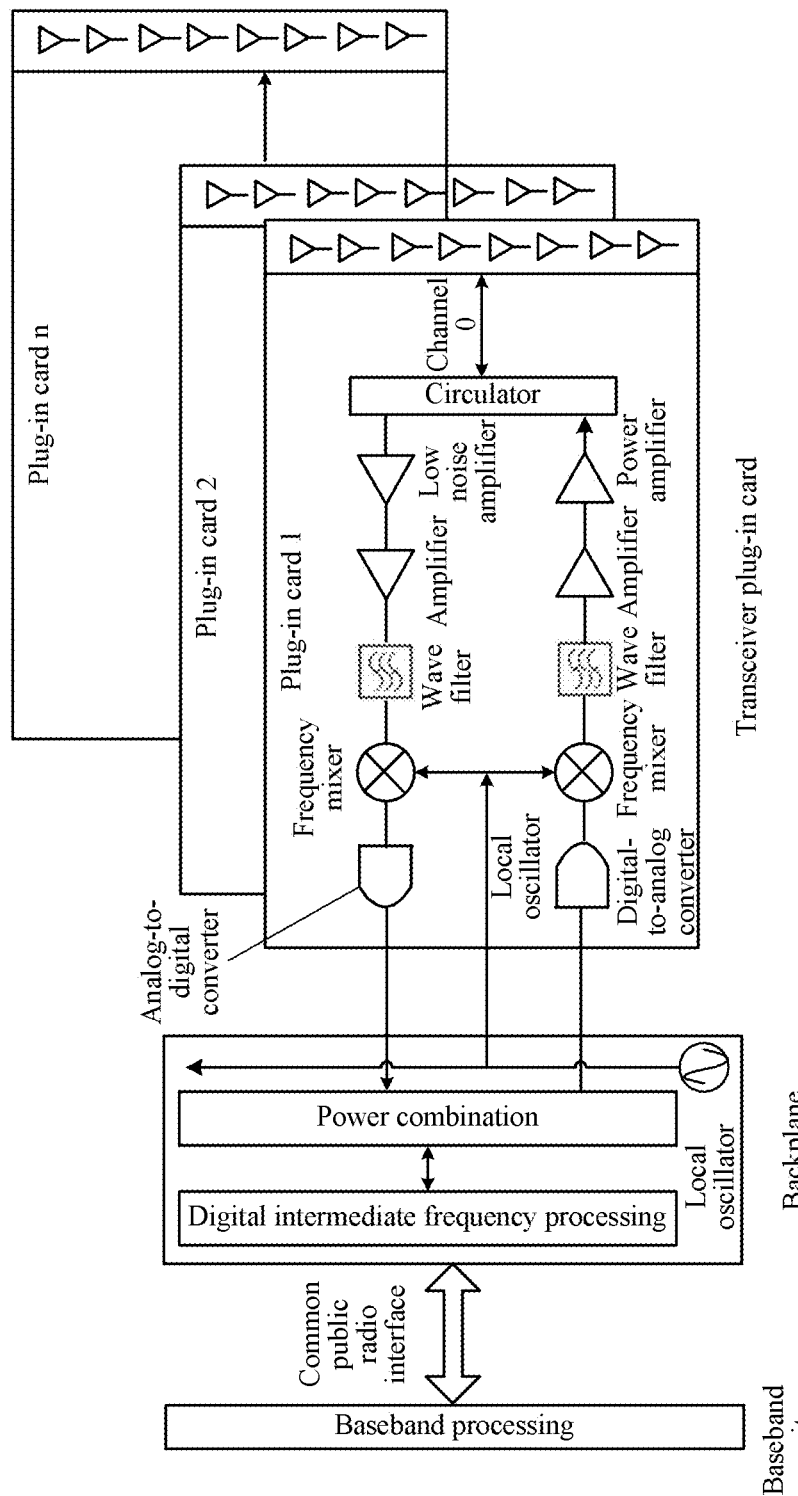
FIG. 1 is a logical block diagram of an architecture of a backplane and a transceiver plug-in card in other approaches.
Figure 2:
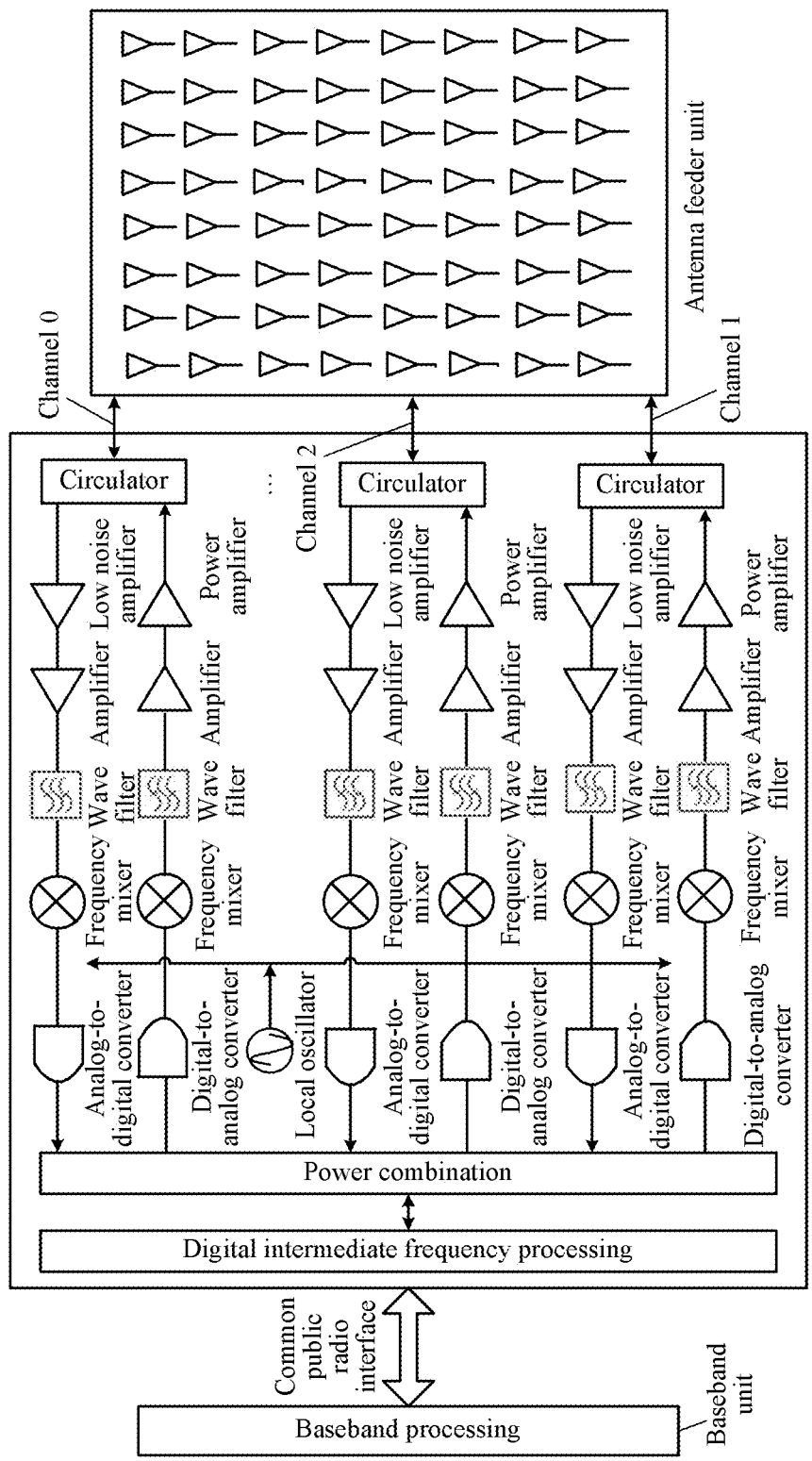
FIG. 2 is a logical block diagram of a base station in a 5G mobile communications system according to this application.

A 5G communications system is used as an example. FIG. 2 is a logical block diagram of a base station in a 5G mobile communications system according to this application. As shown in the figure, the base station includes a BBU, a transceiver unit, and an antenna feeder unit. To support greater communication capacity, the antenna feeder unit may be a multi-antenna array, for example, an array of m rows and n columns of antennas (the antenna array shown in FIG. 2 is an array of eight rows and eight columns of antennas). The corresponding transceiver unit includes n channels, which are Ch0, Ch1, . . . , and Chn respectively (eight channels shown in FIG. 1), and each channel respectively corresponds to a column of antennas. An interface between the BBU and the transceiver unit is a Common Public Radio Interface (CPRI). The CPRI transmits a baseband signal in a digital manner. The CPRI defines an interface relationship between a base station data processing and control unit (REC) and a base station transceiver unit (RE). An interface between the transceiver unit and the antenna feeder unit is a radio frequency (RF) interface. The RF interface is an analog signal interface.

In the base station, usually the transceiver unit and the antenna feeder unit are made into another unit called a RRU module. To achieve lower costs, a smaller volume, and higher conversion efficiency and to support more flexible array configuration, it is of vital importance to select a proper RRU physical implementation architecture. Existing physical implementation architectures in the industry include a "brick architecture" and a "tile architecture" that are commonly seen in a phased-array radar system, and a common "one-board planar architecture" in a wireless communications base station.

The "brick architecture" is also referred to as a plug-in card architecture. A channel in the transceiver unit and a column of antennas in the antenna feeder unit are made into a physical plug-in card, and the "brick architecture" is so named because each plug-in card is similar to a brick. The plug-in card architecture is characterized by flexible configuration and easy expansion, and has high space utilization and an obvious advantage in volume, since a width of a module is reduced by increasing a height of the module. In addition, for the plug-in card architecture, a transmission path from a PA to an antenna feeder system is short, with a low loss and high module conversion efficiency. However, heat dissipation is a big headache because a degree of circuit integration is high.

In the "tile architecture", front-end circuits of transceiver units and a sub-array of the antenna feeder unit are made into a physical module, and then a plurality of modules are combined to form a complete antenna feeder unit. The "tile architecture" is so named because the physical implementation architecture is similar to tiles. A high-integration front-end circuit chip is needed to implement the tile architecture. Such type of chips usually uses a complementary metal-oxide-semiconductor (CMOS) technology and a silicon-germanium bipolar and complementary metal-oxide-semiconductor (SiGe BiCMOS) technology, with limited power output capability and PA efficiency, and therefore is usually not used in a high-power macro base station.

In the "one-board planar architecture", the transceiver unit is integrated into one or more printed circuit boards (PCBs). In a 28 gigahertz (GHz) or 39 GHz high-frequency base station, a total area of a PCB of a 16-channel transceiver unit is usually greater than 30×50 centimeters squared ($cm^2$). In other words, the area is far greater than an area 5×10 $cm^2$ of the antenna feeder unit. The 16-channel transceiver unit includes 16 PAs. Power consumption of each PA is about 10 watts, and output signals of the PAs are fed into 16 waveguide feeding ports. A basic requirement is that a connection loss from the PAs to the antenna feeder unit is as small as possible, and connection costs are as low as possible. Therefore, physical locations of the 16 PAs need to be as close as possible to the 16 waveguide feeding ports. However, if the locations of the PAs are excessively close, heat dissipation is hindered, because both device density and heat density go beyond engineering processing capability.

Both the plug-in card architecture and a backplane architecture are improved in this application, and can be applied to the foregoing three architectures but are not limited to the foregoing three architectures. In addition, this application may be further applied to a transport network, such as a wireless backhaul product, or may be applied to an electronic defense product, such as a front end of a phased-array radar.

Figure 3:
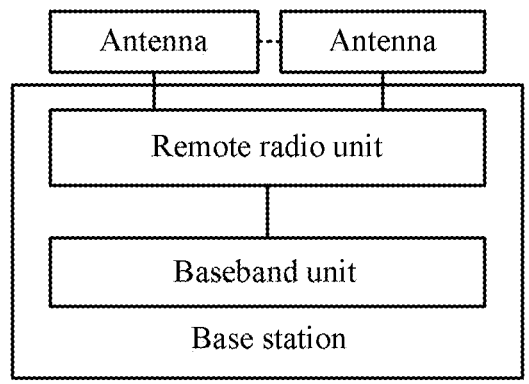
FIG. 3 is a schematic architectural diagram of a base station according to this application.

FIG. 3 is a schematic architectural diagram of a base station according to this application. As shown in the figure, a structure of the base station may include an RRU and a BBU. The RRU is connected to an antenna feeder system (antenna), and the BBU and the RRU may be taken apart for use as required. The RRU may be specifically classified into a super heterodyne intermediate frequency RRU, a zero intermediate frequency RRU, and a software-defined radio (SDR) ideal intermediate frequency RRU. In the super heterodyne intermediate frequency RRU, a two-stage spectrum shifting structure, namely, a complex intermediate frequency structure (a so-called super heterodyne intermediate frequency structure), is used for signal modulation and demodulation, to perform a spectrum shift separately on a digital intermediate frequency channel and a radio frequency channel. In the zero intermediate frequency RRU, a spectrum shift is performed directly on a radio frequency channel. In an SDR ideal intermediate frequency RRU, a frequency shift is performed directly on a digital intermediate frequency channel, to process digital-to-analog conversion of a radio frequency signal.

Figure 4:
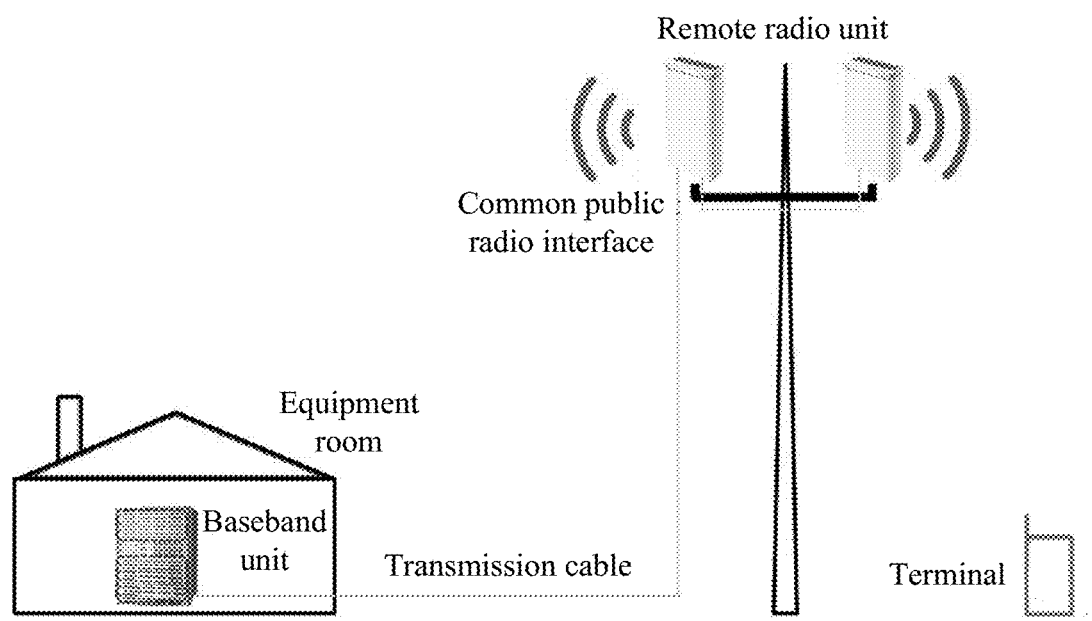
FIG. 4 is a schematic diagram of an application scenario of a base station according to this application.

It should be understood that the base station in this application is specifically applied to a scenario shown in FIG. 4. FIG. 4 is a schematic diagram of an application scenario of the base station according to this application. An application scenario of this application is a wireless 5G high-power base station RRU module. As shown in the figure, in a 5G base station network, an RRU module may be mounted on a pole fixed on the top of an outdoor iron tower. The RRU module integrates an antenna feeder unit and a transceiver unit of the base station. In an uplink direction, a weak signal from a mobile subscriber is received, and after being processed by the transceiver unit, the signal is converted into a digital intermediate frequency signal that complies with CPRI interface standards, and then the digital intermediate frequency signal is transmitted through a transmission cable to a BBU module inside an equipment room. In a downlink direction, a digital intermediate frequency that complies with CPRI interface standards is received from the BBU module, and after being processed by the transceiver unit, the signal is converted into a high-power microwave signal, and then the high-power microwave signal is radiated out of the antenna feeder unit. Major functions of the BBU are to modulate and demodulate data in order to restore subscriber's information.

The following separately describes in detail, in five parts, the signal transceiver apparatus in this application.

Embodiment 1. General Introduction to the Signal Transceiver Apparatus

Figure 5:
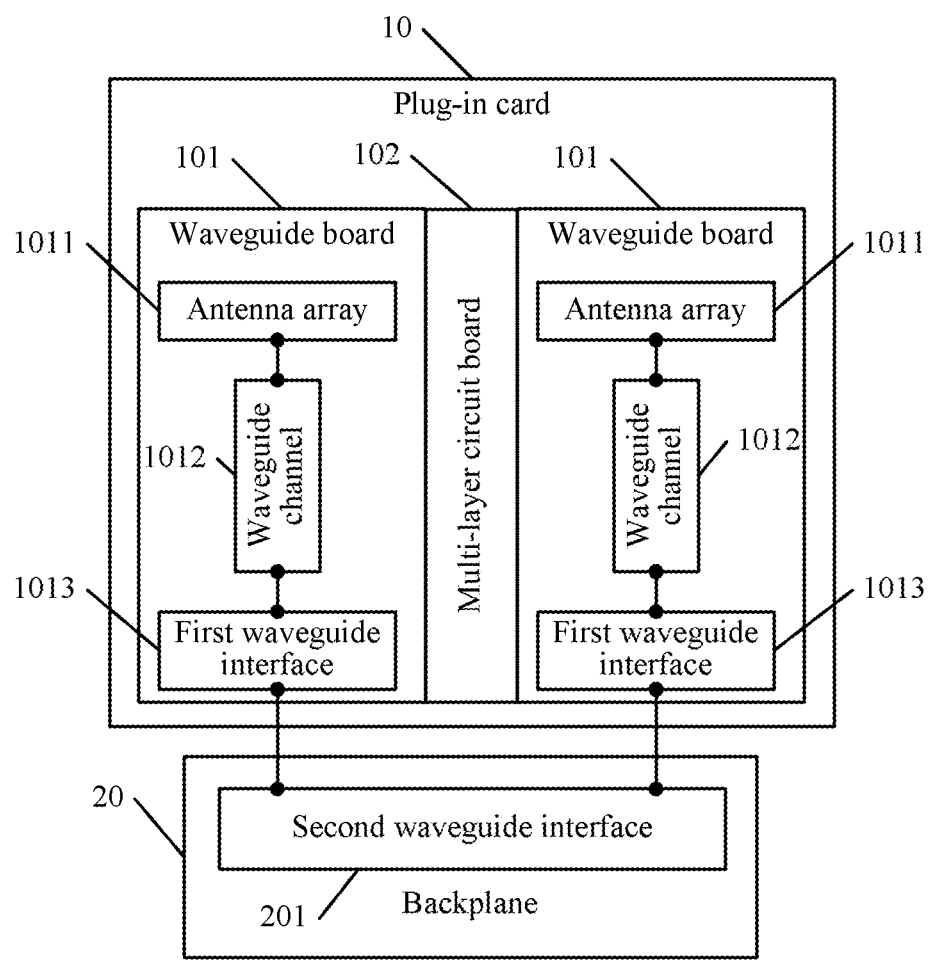
FIG. 5 is a schematic structural diagram of a signal transceiver apparatus according to an embodiment of this application.

FIG. 5 is a schematic structural diagram of the signal transceiver apparatus according to this embodiment of this application. As shown in the figure, the signal transceiver apparatus includes at least one plug-in card 10 and a backplane 20. The plug-in card 10 includes two waveguide boards 101, a multi-layer circuit board 102 disposed between the two waveguide boards 101, and an antenna array 1011 and a first waveguide interface 1013 that are mounted on each of the two waveguide boards 101. A waveguide slot is provided on one side, facing the multi-layer circuit board 102, of each of the two waveguide boards 101. A metal layer that matches the waveguide slot is disposed on each of two sides of the multi-layer circuit board 102. The matching means that the metal layers and the waveguide slots cooperate to form two waveguide channels 1012 that are respectively located on two sides of the multi-layer circuit board 102 and that each are connected to the antenna array 1011 and the first waveguide interface 1013. A second waveguide interface 201 is disposed on the backplane 20. Waveguide connection between the plug-in card 10 and the backplane 20 is implemented through interconnection between the first waveguide interface 1013 and the second waveguide interface 201.

Figure 6:
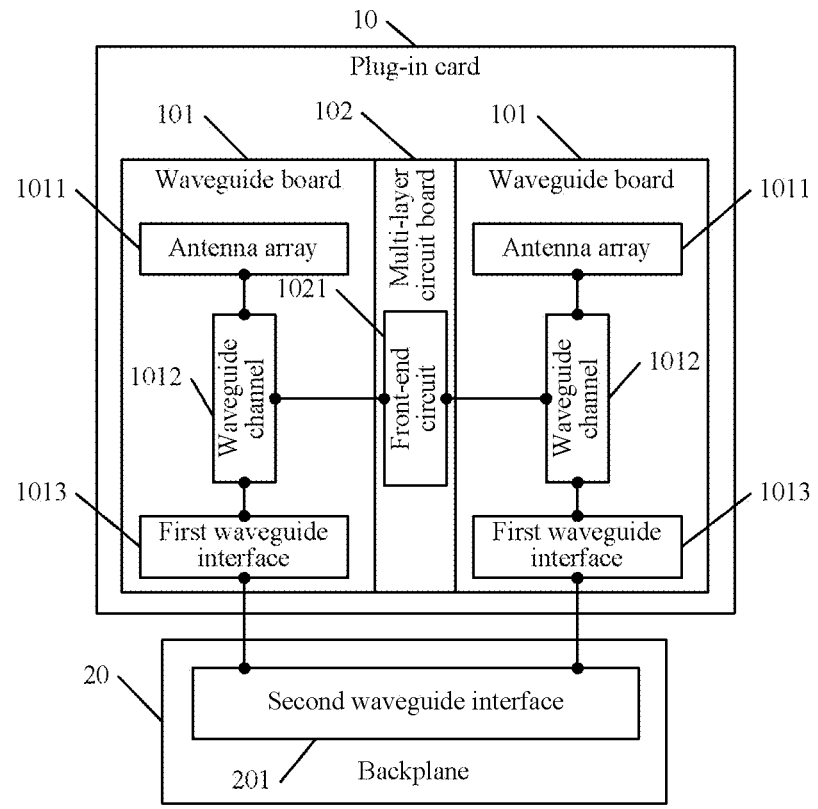
FIG. 6 is another schematic structural diagram of a signal transceiver apparatus according to an embodiment of this application.

Optionally, FIG. 6 is another schematic structural diagram of the signal transceiver apparatus according to this embodiment of this application. As shown in the figure, the plug-in card 10 further includes a front-end circuit 1021 disposed on the multi-layer circuit board 102, and the front-end circuit 1021 is directly connected to the antenna array 1011 using the waveguide channels 1012 and is configured to amplify a radio frequency signal received or sent by the antenna array 1011.

In this embodiment, a structure of the signal transceiver apparatus is introduced. The structure mainly includes the plug-in card 10 and the backplane 20. The plug-in card 10 and the backplane 20 are connected in an air waveguide blind-mate manner. During specific implementation, the plug-in card 10 integrates only one or two waveguide channels 1012 and the front-end circuit 1021. In this way, a performance requirement for connecting the plug-in card 10 and the backplane 20 is lowered, a condition is created for implementing the connection in the waveguide blind-mate manner, and heat consumption of the plug-in card 10 is reduced as much as possible such that the plug-in card can implement natural heat dissipation using a heat dissipation device on the backplane 10.

Figure 7:
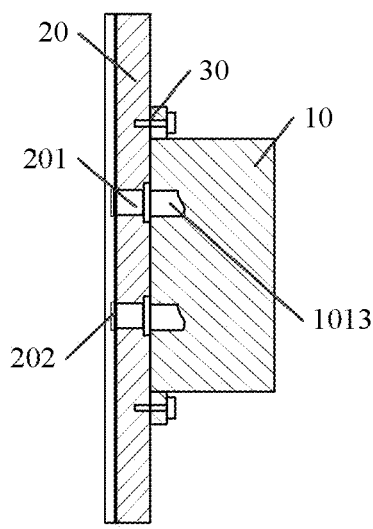
FIG. 7 is a schematic sectional view of cooperation between a plug-in card and a backplane according to an embodiment of this application.

For ease of understanding, refer to FIG. 7. FIG. 7 is a schematic sectional view of cooperation between the plug-in card and the backplane according to this embodiment of this application. As shown in the figure, after the plug-in card 10 is fixed onto the backplane 20 using upper and lower fitting screws 30, a signal may be transmitted from the backplane 20 to the plug-in card 10, and an electromagnetic wave signal is transmitted through the second waveguide interface 201 and the first waveguide interface 1013. The waveguide blind-mate connection has error tolerance capability. Signal integrity is not affected even if misplacement or a gap exists between the waveguide interfaces of the plug-in card 10 and the backplane 20.

Figure 8:
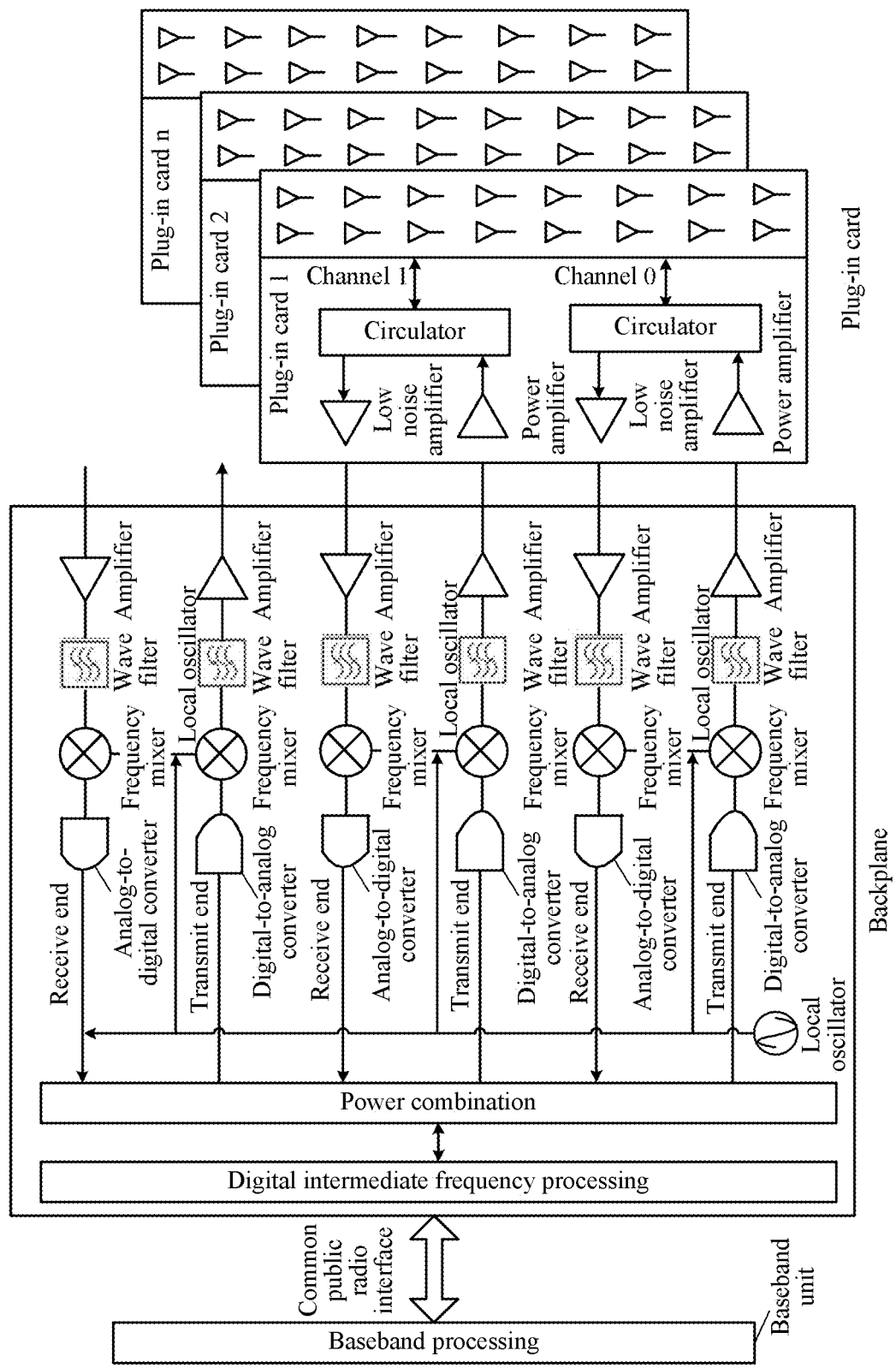
FIG. 8 is a logical block diagram of an architecture of a signal transceiver apparatus according to an embodiment of this application.

FIG. 8 is a logical block diagram of an architecture of the signal transceiver apparatus according to this embodiment of this application. As shown in the figure, a vast majority of circuit units in circuits of the signal transceiver apparatus, such as units for digital intermediate frequency processing and power combination, a local oscillator (LO), a digital-to-analog converter (DAC), an analog-to-digital converter (ADC), a frequency mixer, a wave filter, and an amplifier, are placed in the backplane (namely, a module in the middle of FIG. 8). Therefore, backplane circuits are characterized by mixing of a digital circuit and an analog circuit. The analog circuit needs to include a microwave up-mixer and a microwave down-mixer such that a sent or received external interface signal is a radio-frequency small signal. PA, LNA, circulators, and two columns of antenna sub-array units, all of which correspond to two waveguide channels, are made into a plug-in card (namely, a module on the right in FIG. 8). Therefore, such a plug-in card is different from a passive plug-in card or another active plug-in card that integrates more mixed digital and analog circuits.

It needs to be noted that, the plug-in card provided in this application is an active plug-in card that integrates only a last-stage PA and a first-stage LNA, and may be an active plug-in card that integrates a drive-level and last-stage PA, a first-stage LNA, and a second-stage LNA, or may be a plug-in card that integrates more front-end circuits but has neither a microwave up-mixer nor a microwave down-mixer, to ensure that an external interface signal is a radio-frequency small signal. An interface signal between the plug-in card and the backplane may be a radio-frequency small signal, and a waveguide blind-mate interface is used for the connection between the plug-in card and the backplane.

In this embodiment of this application, a signal transceiver apparatus is provided. Two waveguide channels may be formed using two waveguide boards and a multi-layer circuit board, and each waveguide channel is connected to one antenna array such that a degree of integration of a waveguide structure can be improved, and a quantity of plug-in cards is reduced in a scenario in which a same quantity of antennas is needed, thereby improving space utilization of the signal transceiver apparatus and facilitating heat dissipation of the signal transceiver apparatus.

Embodiment 2. Introduction to the Plug-In Card

Figure 9:
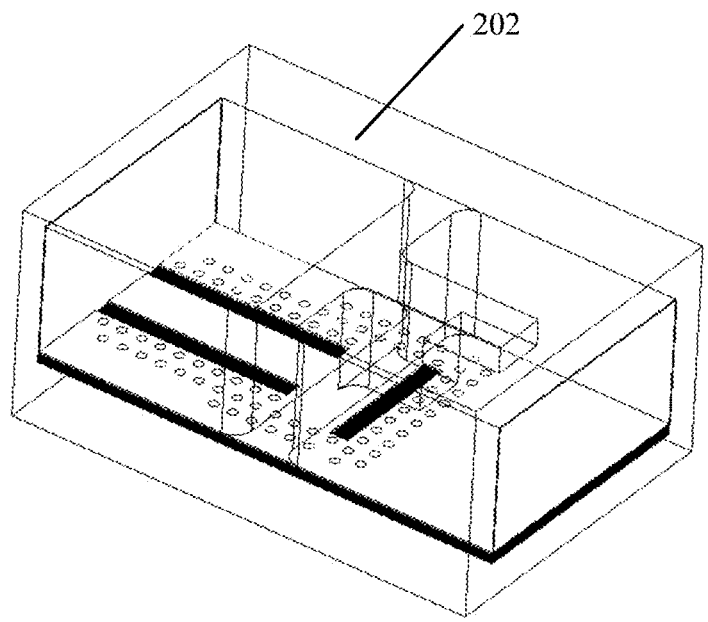
FIG. 9 is a schematic three-dimensional structural diagram of a waveguide conversion section according to an embodiment of this application.
Figure 10:
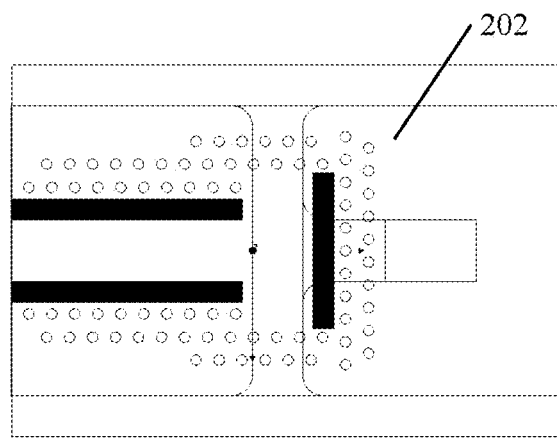
FIG. 10 is a top view of a waveguide conversion section according to an embodiment of this application.

Optionally, on a basis of the embodiment corresponding to FIG. 5, refer to FIG. 6 and FIG. 7 again. As can be seen from the figures, the front-end circuit 1021 is connected to the waveguide channels 1012 using waveguide conversion sections 202. The waveguide conversion section 202 is a substrate integrated waveguide (SIW), and a specific implementation is that a microstrip is converted to an SIW, and the SIW is then converted to a waveguide. For ease of description, refer to FIG. 9 and FIG. 10. FIG. 9 is a schematic three-dimensional structural diagram of the waveguide conversion section according to this embodiment of this application, and FIG. 10 is a top view of the waveguide conversion section according to this embodiment of this application. As shown in the figures, two rows of metal vias are implemented using a PCB technology, a low temperature co-fired ceramic (LTCC) technology or a thin-film technology. An electromagnetic wave is confined to a rectangular cavity, where the rectangular cavity is formed by the two rows of metal vias, an upper metal border, and a lower metal border. In high-frequency application, because a wavelength is excessively small, the microstrip often fails if a tolerance requirement is excessively high. Although a waveguide is commonly used in a high-frequency case, the waveguide has a large volume and can hardly be integrated. Consequently, the SIW emerges. As a transmission line between the microstrip and a dielectric-filled waveguide, the SIW has merits of both a conventional waveguide and a microstrip transmission line, and can implement a high-performance microwave or millimeter-wave planar circuit.

Optionally, specifically an LNA and a PA are further disposed in the front-end circuit 1021 of the plug-in card 10. The LNA is mainly configured to perform low-noise amplification on a radio frequency signal received by the antenna array 1011. The PA is mainly configured to perform power amplification on the radio frequency signal, and send the radio frequency signal on which power amplification is performed to the antenna array 1011.

During design of a receive circuit, because a signal-to-noise ratio of the receive circuit is usually very low, more often a signal is weaker than noise. When the signal passes an amplifier, if noise generated by the amplifier itself is excessively strong, subsequent processing is greatly hindered, therefore, a LNA needs to be used instead. A major function of the PA is to amplify power to meet a system requirement, and a most important indicator is output power. The PA mainly focuses on the output power, and therefore the PA is usually used at a last stage of a transmitter. The LNA mainly focuses on a noise factor, and therefore the LNA is usually used at a front stage of the transmitter.

Optionally, the two waveguide boards 101 of the plug-in card 10 are connected to a grounding plane of the multi-layer circuit board 102. The two waveguide boards 101 are a substrate of the front-end circuit 1021, and can shield the front-end circuit 1021 from an interference signal and dissipate heat of the front-end circuit 1021. The substrate may be a metal material. Because the metal material is a good thermal conductor, thermal conductivity of the front-end circuit 1021 can be significantly improved, thereby prolonging a service life of the front-end circuit 1021.

Figure 11:
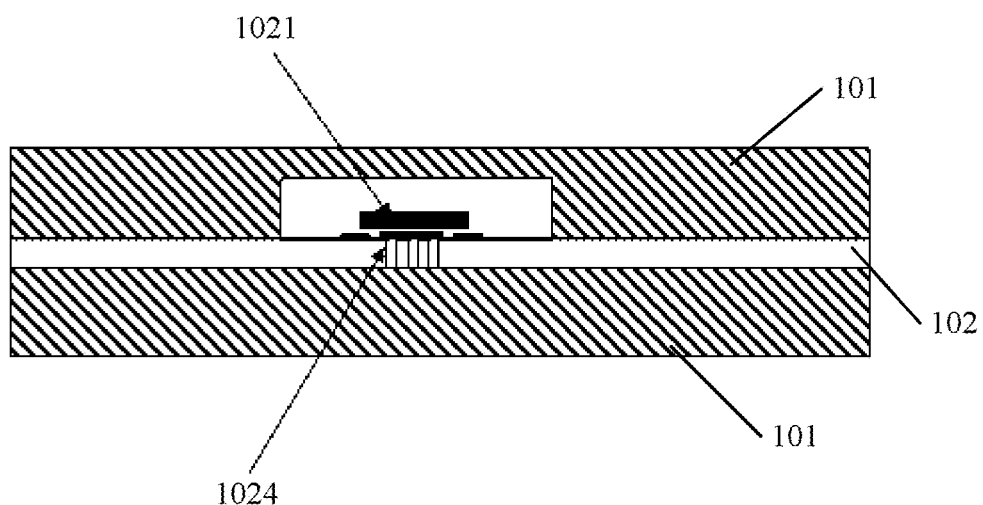
FIG. 11 is a cutaway drawing of a plug-in card according to an embodiment of this application.

For ease of description, refer to FIG. 11. FIG. 11 is a cutaway drawing of a plug-in card according to this embodiment of this application. Components of the front-end circuit 1021 are connected to a surface of the multi-layer circuit board 102 using a surface mount technology (SMT). There is a heat dissipation pad at a bottom of the components of the front-end circuit 1021. A heat conduction via 1024 is formed in the multi-layer circuit board 102. Heat may be conducted from the pad to the heat conduction via 1024, and then conducted to the waveguide board 101, thereby implementing heat dissipation.

Figure 12:
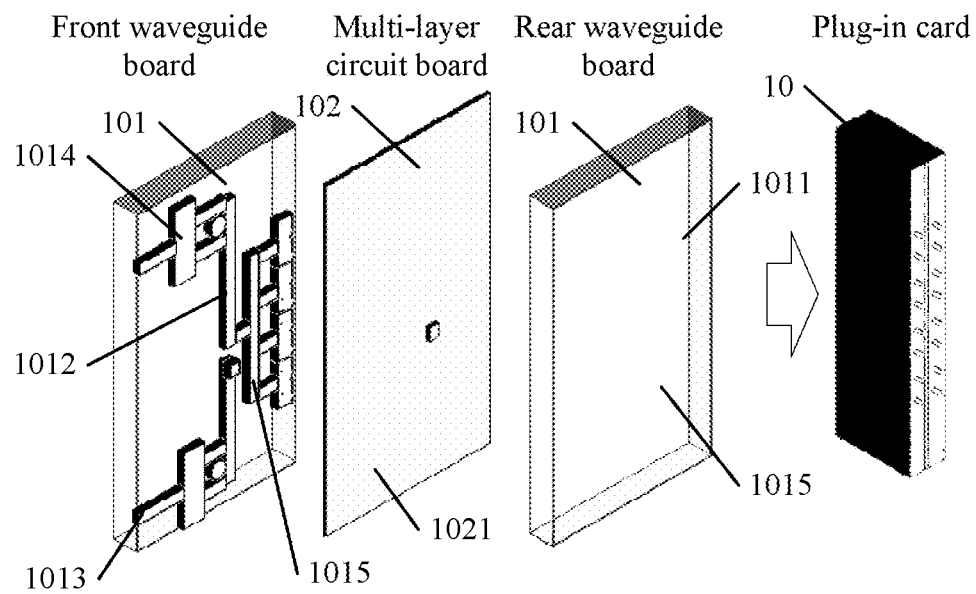
FIG. 12 is an exploded view of a plug-in card according to an embodiment of this application.

FIG. 12 is an exploded view of a plug-in card according to this embodiment of this application. As shown in the figure, using a 28 GHz frequency band as an example, a thickness of the plug-in card may be 11 millimeters (mm), or using a 39 GHz frequency band as an example, a thickness of the plug-in card may be 8 mm. In this application, using a front waveguide board 101, the multi-layer circuit board 102 and a rear circuit board 101 in a sandwiching, the front-end circuit 1021 including a PA and an LNA is integrated into the front waveguide board 101. For the front waveguide board 101, an entire metal plate is used to machine a shielding cavity 1014 and a waveguide slot 1015 respectively as a shielding part and a waveguide transmission line of the front-end circuit 1021 including the PA and the LNA. For the rear waveguide board 101, an entire metal plate is used to machine a waveguide slot 1015, to serve as a heat dissipation part and a waveguide transmission line of the front-end circuit 1021 including the PA and the LNA. Both waveguide boards 101 are connected to the multi-layer circuit board 102 using a tin-soldering technology.

Using an 8×2 waveguide slotted antenna array shown in FIG. 12 as an example, a column of waveguide antenna feeder units on the left includes a waveguide feeder, a 1-to-4 waveguide power divider network, and four waveguide resonant cavities. Two slots are formed in each waveguide resonant cavity, and a total of eight slots are formed in a side face of the plug-in card 10. Totally two columns of waveguide antenna feeder units on the left and right in FIG. 12 form the plug-in card 10 that includes the 8×2 waveguide slotted antenna array.

Figure 13:
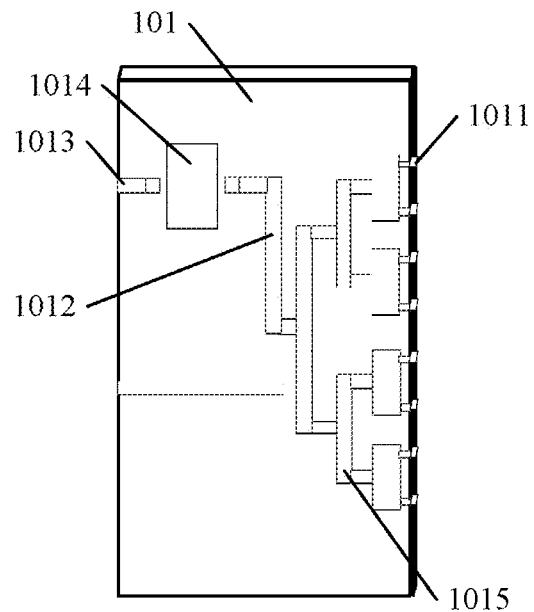
FIG. 13 is a top view of a waveguide board of a plug-in card according to an embodiment of this application.
Figure 14:
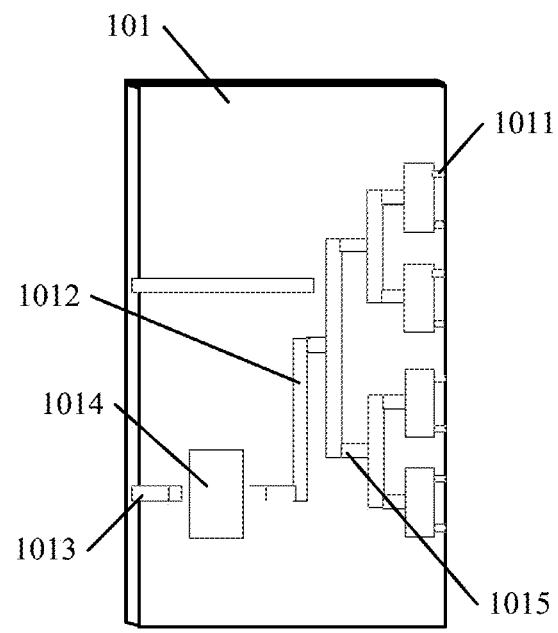
FIG. 14 is a top view of another waveguide board of a plug-in card according to an embodiment of this application.
Figure 15:
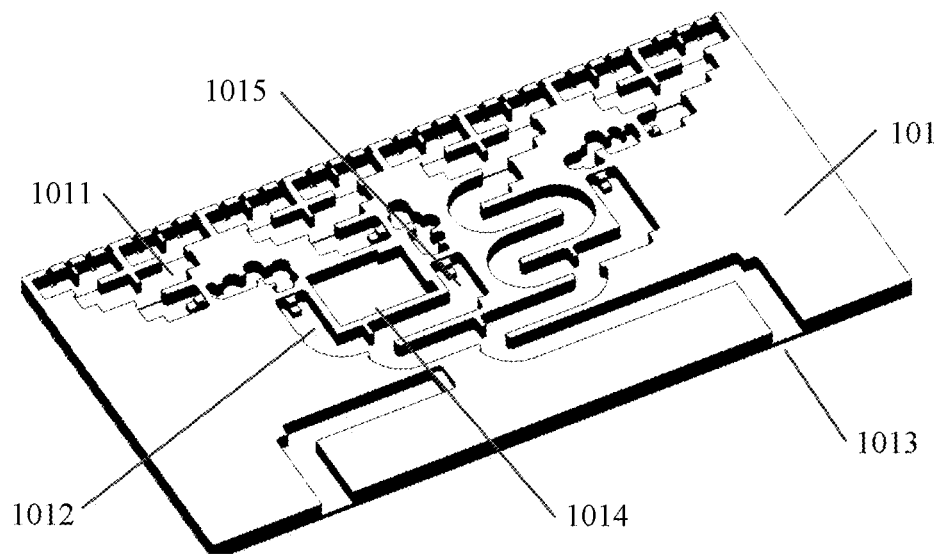
FIG. 15 is a schematic three-dimensional structural diagram of a waveguide board of a plug-in card according to an embodiment of this application.

Specifically, refer to FIG. 13, FIG. 14, and FIG. 15. FIG. 13 is a top view of a waveguide board of the plug-in card according to this embodiment of this application, FIG. 14 is a top view of another waveguide board of the plug-in card according to this embodiment of this application, and FIG. 15 is a schematic three-dimensional structural diagram of a waveguide board of the plug-in card according to this embodiment of this application. The front waveguide board 101 and the rear circuit board 101 separately include an antenna array 1011, a waveguide channel 1012, a first waveguide interface 1013, a shielding cavity 1014, and a waveguide slot 1015. The shielding cavity 1014 is mainly configured to shield the front-end circuit 1021 from impact of an interference signal, and the waveguide slot 1015 is mainly configured to cooperate with the metal layer on the multi-layer circuit board 102, to form two waveguide channels 1012 that are respectively located on two sides of the multi-layer circuit board 102 and that each are connected to the antenna array 1011 and the first waveguide interface 1013.

Figure 16:
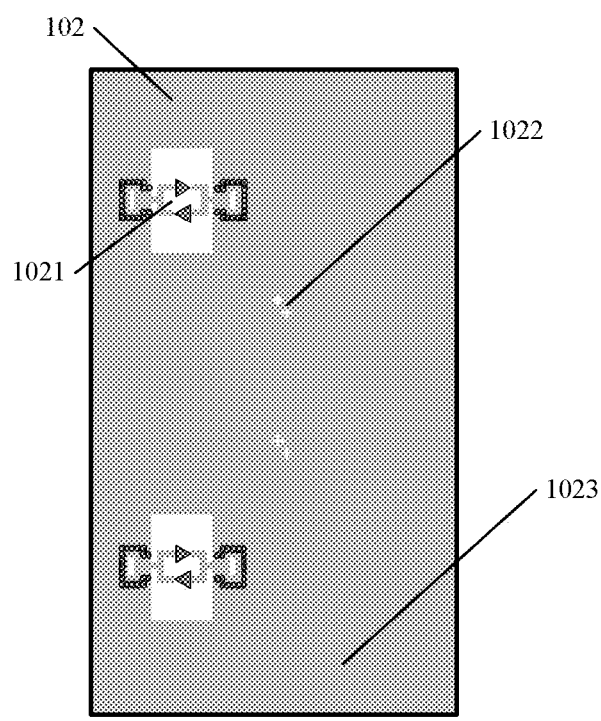
FIG. 16 is a top view of a multi-layer circuit board according to an embodiment of this application.

FIG. 16 is a top view of the multi-layer circuit board according to this embodiment of this application. As shown in the figure, a front-end circuit 1021, namely, two groups of PAs and LNAs in FIG. 16, is disposed on the multi-layer circuit board 102. In addition, a punched hole 1022 is further formed in the multi-layer circuit board 102. The punched hole 1022 in FIG. 16 is merely an example. In practical application, there may be one or more punched holes 1022, a shape of the punched hole 1022 may be a rectangle, a circle, a cross, or another shape, and the punched hole shown herein is only an example and shall not be construed as any limitation on this application. In FIG. 16, a white area of the multi-layer circuit board 102 is dielectric, a gray area is a metal layer 1023, and black lines are wiring of the multi-layer circuit board 102.

The metal layer 1023 corresponding to the waveguide slot 1015 is disposed in both a front side and a rear side of the multi-layer circuit board 102, and the metal layer 1023 may be specifically a copper coating. The copper coating is in a rose color, soft, extensible, and easy to polish, and has good thermal conductivity and electrical conductivity. In addition, the copper coating can improve a binding force between a base metal and a surface (or middle) coating, and is also conducive to deposition of the surface coating. When there is no hole on the copper coating, corrosion resistance of the surface coating can be improved. In this application, the metal layer 1023 is actually copper foil covered on the multi-layer circuit board 102.

It needs to be noted that, in actual application, the metal layer 1023 may further use another metal as a drawing layer, and the copper coating and a nickel coating are examples only and shall not be construed as any limitation on this application.

The following separately describes various layers of the multi-layer circuit board 102.

(1) Top wiring layer (top layer). This layer is designed for top-layer copper foil wiring. This layer does not exist if there is only a single panel.

(2) Bottom wiring layer (bottom layer). This layer is designed for bottom-layer copper foil wiring.

(3) Top/bottom solder-resist green oil layer (top/bottom solder). This layer prevents the copper foil from being soldered and keeps insulation. Solder-resist green oil is not applied to the pad, the via, and non-electrical wiring of this layer.

(4) Top/bottom paste layer (top/bottom paste). This layer is usually used to add a solder paste in a SMT reflow soldering process of a surface-mounted component. The front-end circuit 1021 is assembled onto a PCB (namely, the multi-layer circuit board 102) using SMT.

(5) Top/bottom silkscreen layer (top/bottom overlay). This layer is designed as various silkscreen marks, such as a component designator, a character, and a trademark.

(6) Mechanical layer. This layer is designed as a mechanical shape of the PCB. LAYER1 is a shape layer by default. The others, such as LAYER2/3/4, may be used for mechanical size marking or another special purpose. For example, LAYER2/3/4 or the like may be used when conductive carbon oil needs to be made for some PCBs. However, a purpose of this layer needs to be clearly marked in a same layer.

(7) Keepout layer. This layer is designed as a layer in which wiring is prohibited.

(8) Middle signal layer (midlayer). This layer is often used in a multi-layer board.

(9) Internal electrical layer (internal plane). This layer is used in a multi-layer board.

(10) Through-hole layer (multi layer). This layer is designed as a through-hole pad layer.

(11) Drill guide layer (drill guide). This layer is designed as a drilling center location coordinate layer of the pad and the via.

(12) Drilling drawing layer (drill drawing). This layer is a drilling aperture size drawing layer of the pad and the via.

It may be understood that the multi-layer circuit board 102 in this application may include any of the foregoing layers of circuit boards, and another circuit board layer may be designed as required, and this is not limited herein.

Figure 17:
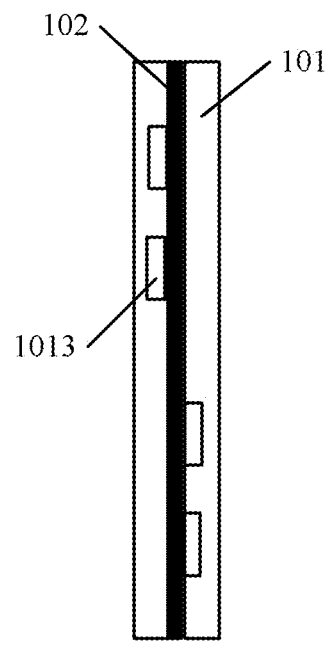
FIG. 17 is a schematic structural diagram of a first waveguide interface on a plug-in card side according to an embodiment of this application.
Figure 18:
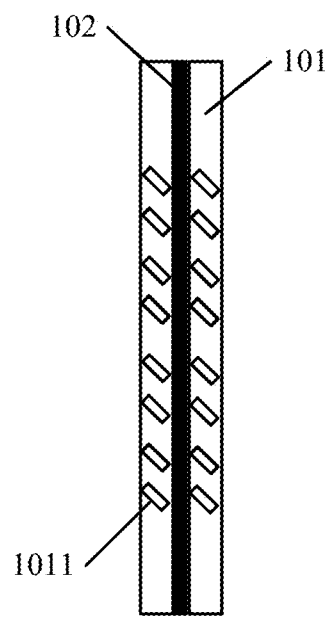
FIG. 18 is a schematic structural diagram of an antenna array on a plug-in card side according to an embodiment of this application.
Figure 19:
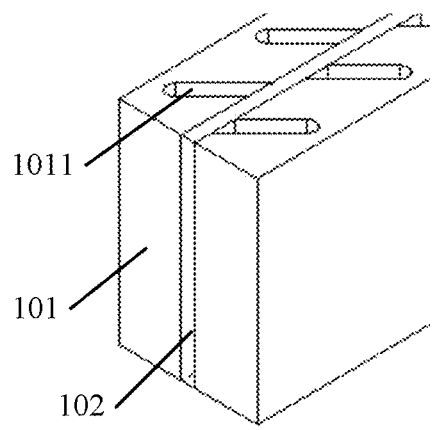
FIG. 19 is a schematic partial structural diagram of an antenna array on a plug-in card side according to an embodiment of this application.
Figure 20:
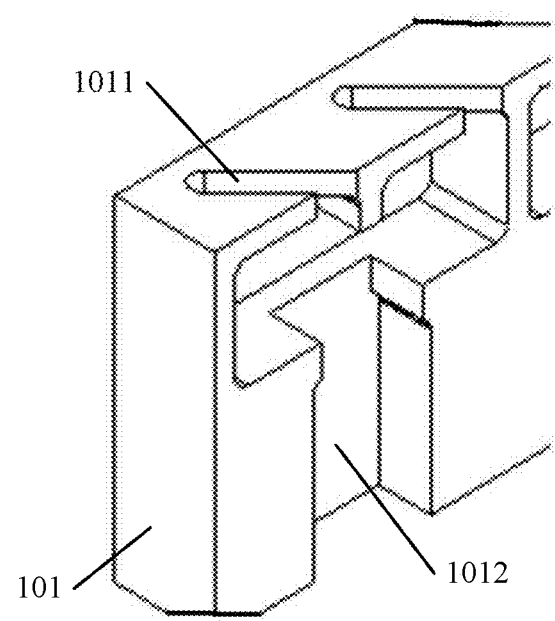
FIG. 20 is a schematic partial sectional view of an antenna array on a plug-in card side according to an embodiment of this application.

For ease of description, refer to FIG. 17, FIG. 18, FIG. 19 and FIG. 20. FIG. 17 is a schematic structural diagram of a first waveguide interface on a plug-in card side according to this embodiment of this application. FIG. 18 is a schematic structural diagram of the antenna array on the plug-in card side according to this embodiment of this application. FIG. 19 is a schematic partial structural diagram of the antenna array on the plug-in card side according to this embodiment of this application. FIG. 20 is a schematic partial sectional view of the antenna array on the plug-in card side according to this embodiment of this application. As shown in the figures, using an 8×2 waveguide slotted antenna array as an example for description, the plug-in card 10 includes two waveguide boards 101, one multi-layer circuit board 102 is disposed between the two waveguide boards 101, a plurality of first waveguide interfaces 1013 are formed on one side of the plug-in card 10, two antenna arrays 1011 are disposed on the other side of the plug-in card 10, and totally 16 antenna arrays are included.

In this embodiment of this application, a plug-in card is provided, where both the front-end circuit and the antenna arrays are disposed in the plug-in card. The plug-in card may be assembled using different antenna array assembly schemes, and sizes of the antenna arrays can be adjusted by configuring a quantity of the plug-in cards, thereby bringing relatively high flexibility to the entire signal transceiver apparatus. In addition, only the front-end circuit and the sub-arrays of the antenna arrays are made into the plug-in card such that the plug-in card is relatively thin and has a height smaller than 1 mm, and can be implemented on Ka frequency band (namely, 26.5 GHz to 40 GHz) for an entire satellite communication. Further, because only the front-end circuit and the sub-arrays of the antenna arrays are made into the plug-in card, a size of the plug-in card in a direction vertical to the backplane is smaller than 10 mm and a thickness of the entire signal transceiver apparatus is smaller than 20 cm such that a mounting mode of the signal transceiver apparatus may be the same as that of a conventional low-frequency signal transceiver apparatus, with high market acceptance.

Embodiment 3. Introduction to the Waveguide Interfaces

Optionally, on a basis of the embodiment corresponding to FIG. 5, the antenna array 1011 further includes two antenna sub-arrays. The two antenna sub-arrays are mounted between the two waveguide boards 101, and the two antenna sub-arrays correspond to the waveguide channels 1012. One of the antenna sub-array is connected to a waveguide channel 1012 formed between one of the two waveguide boards 101 and the multi-layer circuit board 102, and the other antenna sub-array is connected to a waveguide channel 1012 formed between the other waveguide board 101 and the multi-layer circuit board 102.

Figure 21:
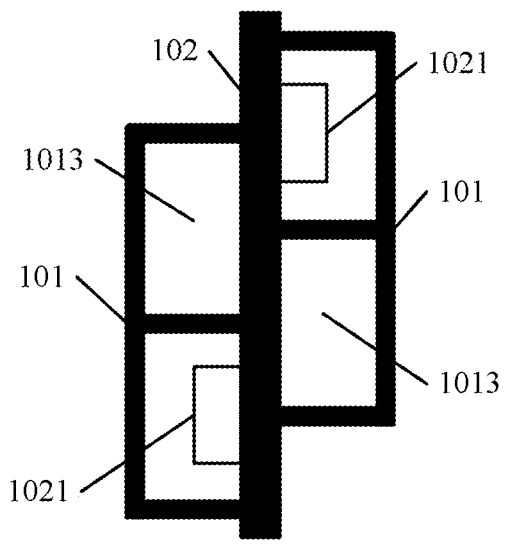
FIG. 21 is a schematic diagram of a double-waveguide structure according to an embodiment of this application.

Optionally, FIG. 21 is a schematic diagram of a double-waveguide structure according to this embodiment of this application. As shown in the figure, the first waveguide interface 1013 includes two groups of waveguide interfaces. One group of waveguide interfaces of the first waveguide interface 1013 is disposed between one waveguide board 101 and the multi-layer circuit board 102 of the plug-in card 10, and the other group of waveguide interfaces of the first waveguide interface 1013 is disposed between the other waveguide board 101 and the multi-layer circuit board 102 of the plug-in card 10.

Figure 22:
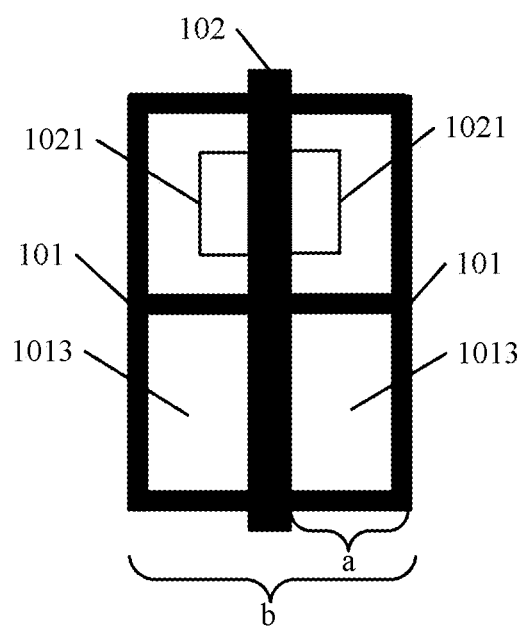
FIG. 22 is another schematic diagram of a double-waveguide structure according to an embodiment of this application.

Specifically, the backplane 20 and the plug-in card 10 are connected using the first waveguide interface 1013 and the second waveguide interface 201, and a connecting part of the double-waveguide structure is disposed in the plug-in card 10. As shown in FIG. 22, a left waveguide board 101 and a right waveguide board 101 separately form two independent waveguides with surface copper of the multi-layer circuit board 102. In other words, one double-waveguide structure integrates two columns of antenna feeders and antennas. In a non-waveguide area, a surface layer of the multi-layer circuit board 102 is soldered with a front-end circuit 1021 such as a phase shifter and a true time delay (TTD) device, or a front-end circuit 1021 such as a PA and an LNA. The microstrip is connected to the waveguides using the waveguide conversion section 202.

Figure 23:
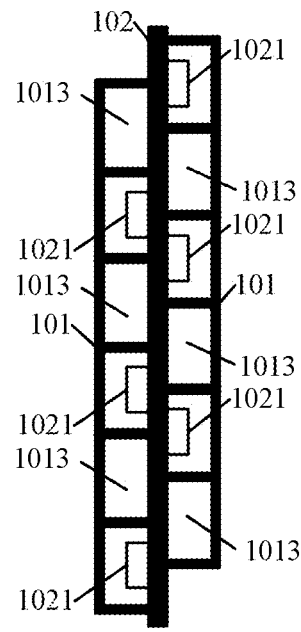
FIG. 23 is a schematic diagram of a vertical array that includes a plurality of double waveguides according to an embodiment of this application.

FIG. 21 introduces a double-waveguide structure, namely, a "triangular array structure". Such a type of structure makes isolation between two adjacent columns of antennas higher. If an isolation requirement for the antenna array is not high, the structure shown in FIG. 22 may be used. FIG. 23 is another schematic diagram of the double-waveguide structure according to this embodiment of this application. As shown in the figure, a 0.53-wavelength antenna array is used for calculation. In a frequency band of 40 GHz, a thickness b of the double-waveguide structure is about 7.6 mm, a thickness of the multi-layer circuit board 102 ranges from 0.5 mm to 1 mm, and a thickness a, including a cavity depth, of a waveguide board 101 on each side is about 3.4 mm. There is no physical dimension interference problem when the front-end circuit 1021 is integrated in a cavity.

Figure 24:
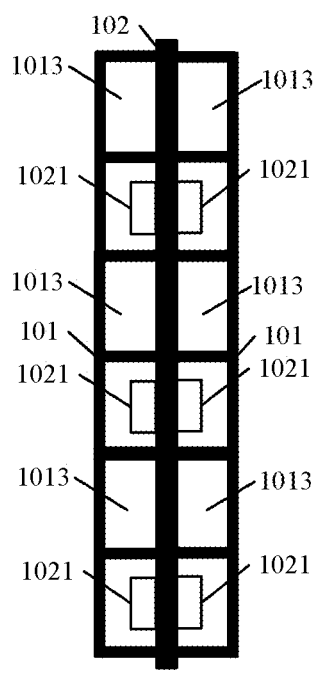
FIG. 24 is another schematic diagram of a vertical array that includes a plurality of double waveguides according to an embodiment of this application.

In actual application, a plurality of double-waveguide structures shown in FIG. 21 may further form a structure shown in FIG. 23. FIG. 23 is a schematic diagram of a vertical array that includes a plurality of double waveguides according to this embodiment of this application. A plurality of the double-waveguide structures shown in FIG. 22 may further form a structure shown in FIG. 24. FIG. 24 is another schematic diagram of a vertical array that includes a plurality of double waveguides according to this embodiment of this application. Certainly, a quantity of the double-waveguide structures may be increased or decreased based on an actual requirement in order to meet a radiation condition of the antenna array.

Figure 25:
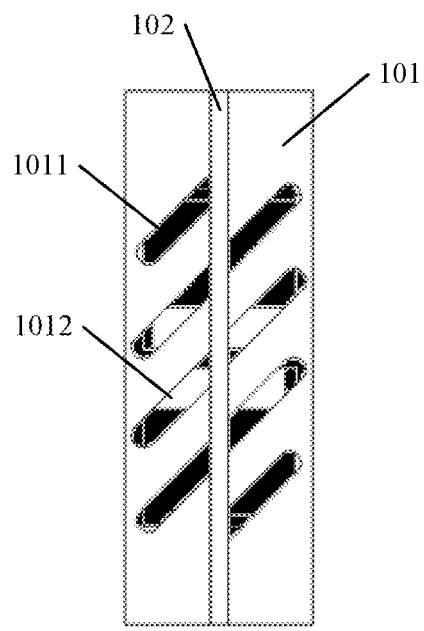
FIG. 25 is a front view of a double-waveguide structure according to an embodiment of this application.
Figure 26:
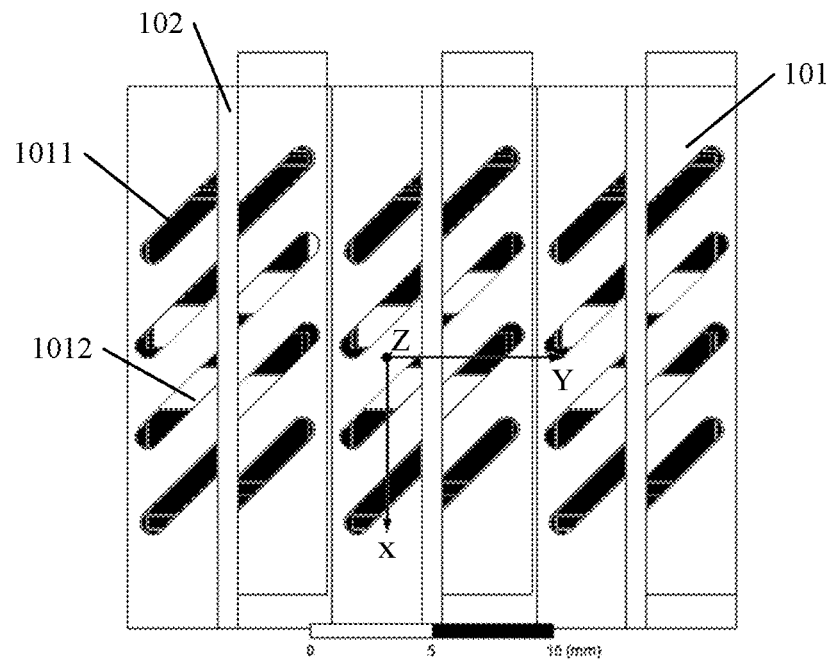
FIG. 26 is a front view of an antenna array that includes double-waveguide structures according to an embodiment of this application.
Figure 27:
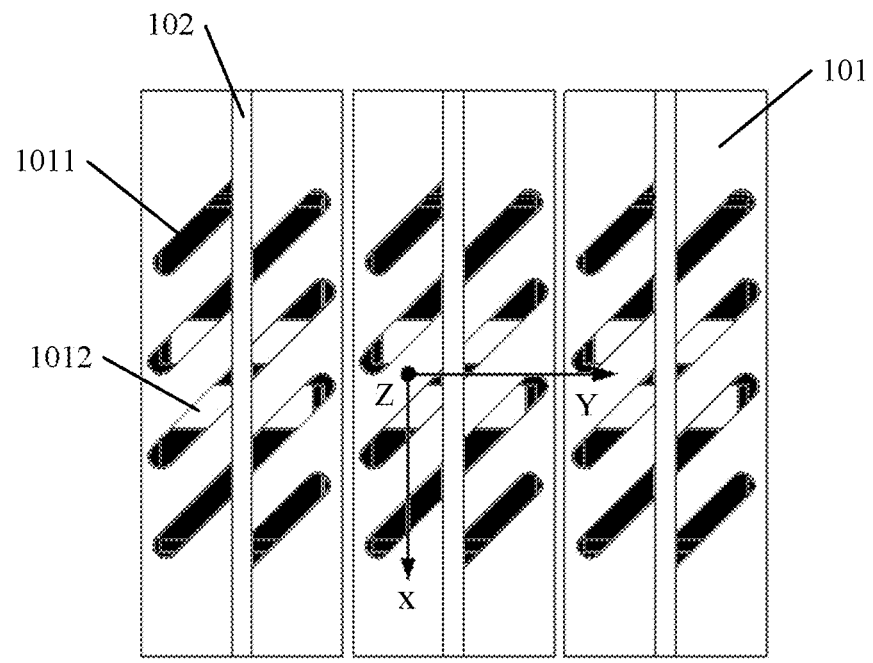
FIG. 27 is another front view of an antenna array that includes double-waveguide structures according to an embodiment of this application.

FIG. 25 is a front view of the double-waveguide structure according to this embodiment of this application. A black part is the antenna array 1011, and a blank part is the waveguide channel 1012, which is hollow. FIG. 25 is also a schematic diagram of one plug-in card 10. If a plurality of plug-in cards 10 are needed, a structure shown in FIG. 26 or FIG. 27 is formed. FIG. 26 corresponds to an antenna array that includes a plurality of FIG. 21, or may be a front view of the double-waveguide structure corresponding to FIG. 23. FIG. 27 corresponds to an antenna array that includes a plurality of FIG. 22, or may be a front view of the double-waveguide structure corresponding to FIG. 24.

Figure 28:
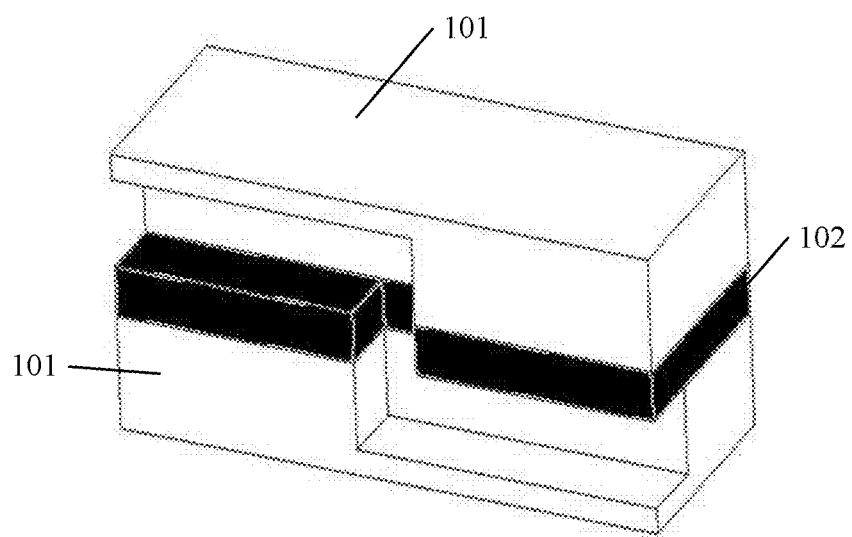
FIG. 28 is a schematic three-dimensional structural diagram of a multi-layer circuit board on which a punched hole is disposed according to an embodiment of this application.
Figure 29:
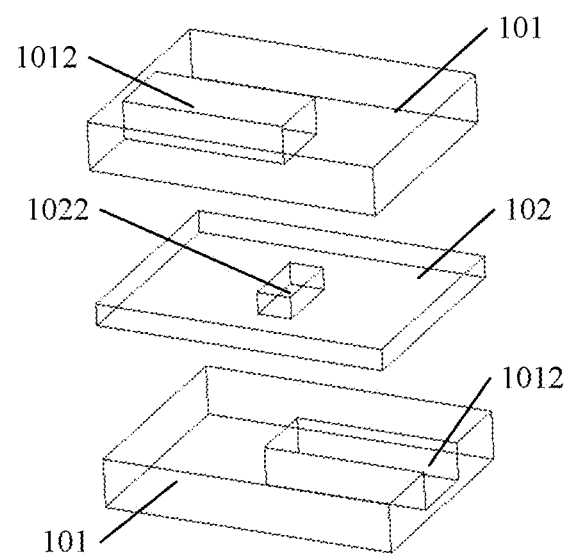
FIG. 29 is an exploded view of a multi-layer circuit board on which a punched hole is disposed according to an embodiment of this application.

Optionally, refer to FIG. 28 and FIG. 29. FIG. 28 is a schematic three-dimensional structural diagram of a multi-layer circuit board on which a punched hole is disposed according to an embodiment of this application. FIG. 29 is an exploded view of a multi-layer circuit board on which a punched hole is disposed according to an embodiment of this application. As shown in the figures, a punched hole 1022 is disposed on the multi-layer circuit board 102, and the punched hole 1022 connects two waveguide channels 1012 that are respectively formed between each of the two waveguide boards 101 and the multi-layer circuit board 102, and that are located on two sides of the multi-layer circuit board 102.

It may be understood that, waveguides on the two sides of the multi-layer circuit board 102 may be independent or mutually correlated. After the punched hole 1022 is formed in the multi-layer circuit board 102, correlation between the waveguides can be implemented. One implementation is that a waveguide on one side of the multi-layer circuit board 102 passes through the multi-layer circuit board 102 and then is transferred to the other side. The waveguide may be considered as a line that transmits a high-frequency signal. With the arrangement of the punched hole 1022, waveguide transmission becomes more flexible, giving way to some circuits and wiring on the multi-layer circuit board 102.

Figure 30:
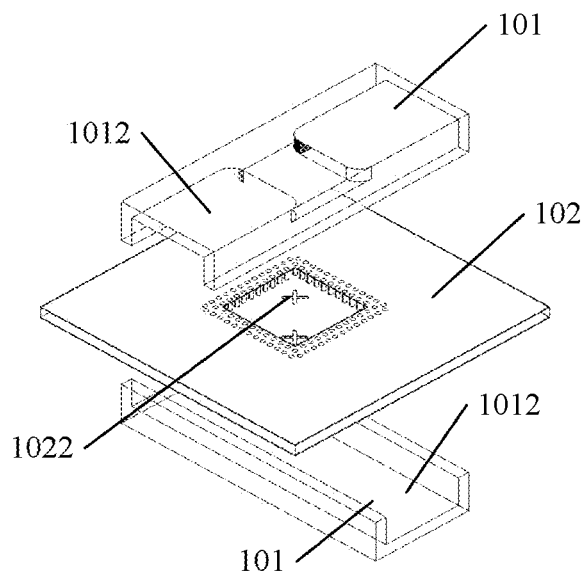
FIG. 30 is an exploded view of a multi-layer circuit board on which a cross groove is disposed according to an embodiment of this application.
Figure 31:
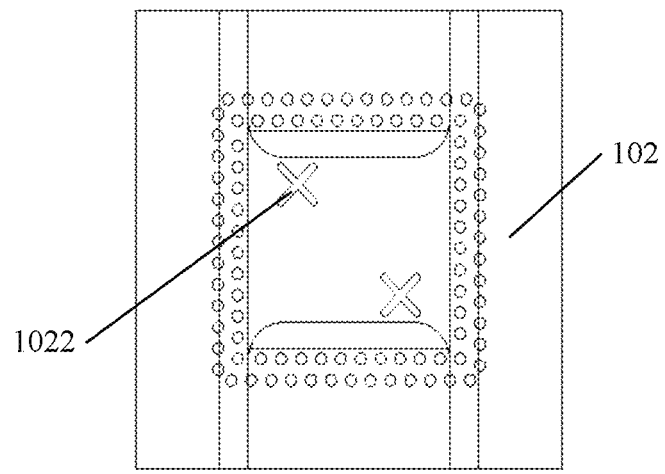
FIG. 31 is a schematic three-dimensional structural diagram of a multi-layer circuit board on which a cross groove is disposed according to an embodiment of this application.

Optionally, refer to FIG. 30 and FIG. 31. FIG. 30 is an exploded view of a multi-layer circuit board on which a cross groove is disposed according to an embodiment of this application. FIG. 31 is a schematic three-dimensional structural diagram of a multi-layer circuit board on which a cross groove is disposed according to an embodiment of this application. At least one cross grove is disposed on the multi-layer circuit board 102, the at least one cross grove is located on a diagonal line of the multi-layer circuit board 102, and the diagonal line is a line segment formed after two opposite angles in an overlapping area of the two waveguide channels 1012 are connected. In other words, one multi-layer circuit board 102 has two diagonal lines, and it suffices if the at least one cross groove is provided on a same diagonal line and two cross grooves do not overlap. The cross groove needs to be disposed in a diagonal form, and located on a diagonal line of an overlapping area of an upper waveguide and a lower waveguide that are orthogonal, to form a dual-cross-hole directional coupler. A size and a location of the cross groove may be adjusted according to specifications of the coupler. It needs to be noted that slotting of an upper cross groove is different from slotting of a lower cross groove, and this relates to signal flow. In general, there are two cross grooves.

It may be understood that, waveguides on the two sides of the multi-layer circuit board 102 may be independent or mutually correlated. After the punched hole 1022 is formed in the multi-layer circuit board 102, correlation between the waveguides can be implemented. Another implementation is that, by slotting of the multi-layer circuit board 102, a signal in a waveguide on one side of the multi-layer circuit board 102 is coupled to a waveguide on the other side. An advantage of the coupling is that, antenna calibration, a test, and the like can be performed, and the calibration and the test can be performed as long as 1% of energy is coupled.

Figure 32:
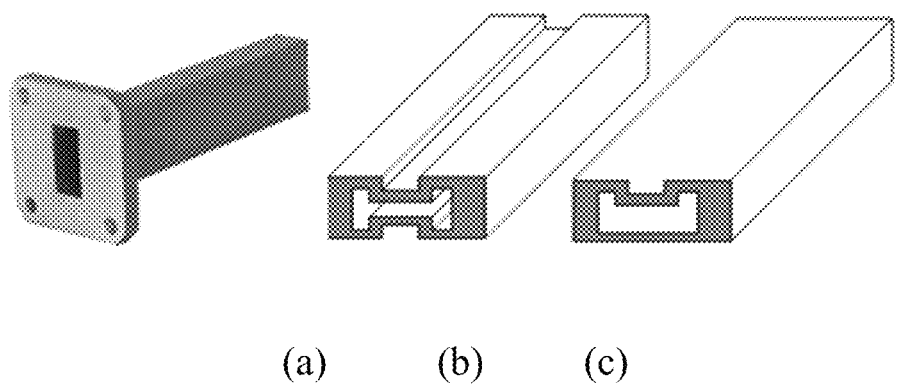
FIG. 32 is a schematic diagram of waveguide interface forms according to an embodiment of this application.

Optionally, when the backplane 20 and the plug-in card 10 are connected using the first waveguide interface 1013 and the second waveguide interface 201, short-path and low-loss waveguide interfaces may be used. The first waveguide interface 1013 and the second waveguide interface 201 are in a form of a rectangular waveguide, or the first waveguide interface 1013 and the second waveguide interface 201 are in a form of a double-ridge waveguide, or the first waveguide interface 1013 and the second waveguide interface 201 are in a form of a single-ridge waveguide. For ease of description, refer to FIG. 32. FIG. 32 is a schematic diagram of a waveguide interface form according to an embodiment of this application, where figure (a) is a rectangular waveguide, figure (b) is a double-ridge waveguide, and figure (c) is a single-ridge waveguide.

In this embodiment of this application, a double-waveguide structure is provided. Blind mate of waveguides of a plug-in card and a backplane can be implemented using the double-waveguide structure. A waveguide blind-mate interface is directly manufactured on the waveguide boards of the plug-in card and a shielding cover of the backplane. There is no requirement for high-speed data connection, and connection costs of a single plug-in card are relatively low. In addition, with the double-waveguide structure, short-path and low-loss waveguide interfaces can be implemented using the multi-layer circuit board of the plug-in card and the waveguide boards of the plug-in card, to effectively lower a covering area of the waveguide structure, thereby implementing relatively high space utilization and relatively high waveguide conversion efficiency.

Embodiment 4. Introduction to the Backplane

Optionally, on a basis of the embodiment corresponding to FIG. 5, the backplane 20 includes a radio frequency circuit and a digital intermediate frequency processing unit. The digital intermediate frequency processing unit is connected to one end of the radio frequency circuit, and the other end of the radio frequency circuit is connected to one end of the plug-in card 10. The radio frequency circuit is configured to perform down-conversion domain processing on a radio frequency signal to obtain an analog intermediate frequency signal, or perform up-conversion processing on an analog intermediate frequency signal to obtain a radio frequency signal. The digital intermediate frequency processing unit is configured to convert an analog intermediate frequency signal into a digital intermediate frequency signal, or convert a digital intermediate frequency signal into an analog intermediate frequency signal.

Figure 33:
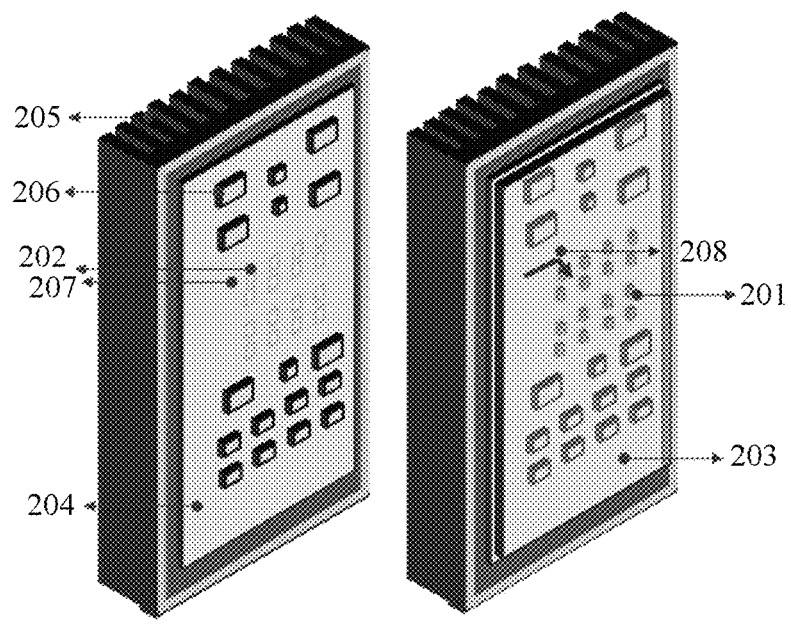
FIG. 33 is a three-dimensional structural diagram of a backplane according to an embodiment of this application.

Optionally, FIG. 33 is a three-dimensional structural diagram of the backplane according to this embodiment of this application. As shown in the figure, the backplane 20 may further include a shielding cover 203, a backplane multi-layer circuit board 204, and a heat dissipation device 205. The shielding cover 203 is disposed on a first surface of the backplane multi-layer circuit board 204, the heat dissipation device 205 is disposed on a second surface of the backplane multi-layer circuit board 204, and the first surface and the second surface are opposite. The shielding cover 203 is configured to perform interference signal shielding. The backplane multi-layer circuit board 204 is configured to allow the digital intermediate frequency processing unit and the radio frequency circuit to be disposed thereon. The heat dissipation device 205 is configured to dissipate heat of the backplane multi-layer circuit board 204.

Most of circuits in a transceiver circuit 206 are disposed on the backplane multi-layer circuit board 204, and then the backplane multi-layer circuit board 204 is mounted onto the heat dissipation device 205 to form a heat dissipation channel. To prevent electromagnetic leakage, the transceiver circuit 206 usually needs the shielding cover 203, which is metallic. A left figure in FIG. 33 shows the backplane when the shielding cover 203 is not added, and a right figure in FIG. 33 shows the backplane when the shielding cover 203 is added. The backplane mentioned in this application includes the backplane multi-layer circuit board 204, the heat dissipation device 205, and the shielding cover 203. A second waveguide interface 201 is disposed on the shielding cover 203. Circuits in the transceiver circuit 206 are connected using a microstrip 207 on the backplane multi-layer circuit board 204. The microstrip 207 is converted to a waveguide conversion section 202, and then connected to the second waveguide interface 201 to form a signal channel. Connection relationships between the microstrip 207, the waveguide conversion section 202, and the second waveguide interface 201 are shown in FIG. 33. FIG. 33 also marks a flow direction of a radio frequency transmit signal 208.

Optionally, the backplane 20 may further include a waveguide choke groove, the waveguide choke groove is disposed on a periphery of the second waveguide interface 201, and the plug-in card 10 and the backplane 20 are connected through the waveguide interface 201 that has the waveguide choke groove. A major function of the waveguide choke groove is to prevent radio frequency signal loss when the first waveguide interface 1013 and the second waveguide interface 201 are misplaced.

In the microwave technology, apparatuses that connect same transmission lines together are usually collectively referred to as connectors. Generally, connectors are classified into two categories coaxial cable connector and waveguide connector. Basic requirements for a connector are as follows reliable electrical contact of a connection point without causing electromagnetic wave reflection, a smallest possible input voltage standing wave ratio, a wide operating band without leakage of electromagnetic energy from the connector, a reliable structure, easy assembly and disassembly, easy manufacturing, and the like. Because waveguide interfaces are used in this application, the following describes an application of the waveguide choke groove using a waveguide structure as an example.

There are mainly two methods for connection between waveguides contact connection and choke connection. The two connection methods are implemented using a flange soldered onto a to-be-connected waveguide port. There are two structural forms of the flange flat flange and choke flange. For a flat flange, a location of a flange hole and a location of the waveguide port should be very accurate, and a surface of the flange should be very flat and smooth. If the surface is skewed or uneven, two segments of waveguides will be eccentric, causing poor contact. In addition, a reflected wave will be generated at a connection position, and electromagnetic energy will be leaked out, or breakdown or fire may occur when power is high. An advantage of the flat flange is that a volume is small and an operating band is wide. The flat flange is mainly used in a wideband waveguide element and a measurement apparatus. A voltage standing wave ratio of the flat flange may be smaller than 1.002.

When used, a choke connector is formed by interconnection between a flange having a waveguide choke groove and a flat flange. There is a small annular slot on the flange having the waveguide choke groove. A short-circuiting plane is formed at a bottom of the small slot, and impedance of the short-circuiting plane is 0. The waveguide choke groove is actually a half-wavelength transmission line that has a short-circuit termination and that is connected to a main waveguide in series. As can be learned from nature of the half-wavelength transmission line that is short-circuited to the terminal, even if mechanical contact between interfaces of the two segments of waveguides is not very smooth or there is a small gap between the interfaces of the two segments of waveguides, electrical contact between the interfaces of the two segments of waveguides is still very good.

In this embodiment of this application, a backplane is provided. The backplane includes most circuits of the signal transceiver apparatus, and these circuits are integrated on the backplane multi-layer circuit board. The shielding cover is disposed on one side of the backplane multi-layer circuit board, to perform interference signal shielding, and the heat dissipation device is disposed on the other side of the backplane multi-layer circuit board, to dissipate heat of the backplane multi-layer circuit board. In this way, heat dissipation and signal interference of the backplane are not affected due to integration of more circuits, thereby improving practicability of the solution. In addition, radio frequency signal leakage probably to be caused by blind mate of waveguides may be further prevented by allowing the waveguide choke groove to be disposed on the periphery of the second waveguide interface, thereby improving transmission reliability of the solution.

Embodiment 5. Actual Application and Experimental Data of the Signal Transceiver Apparatus To test whether the waveguide blind-mate design used in this application can meet electrical performance requirements for the connection between the plug-in card and the backplane, the following test is performed. In a test condition, a frequency ranges from 26.5 GHz to 29.5 GHz, position deviation cases during plugging and unplugging are simulated, including combinations of a gap (0 mm to 0.6 mm) between the plug-in card and the backplane, and a mounting position deviation (0 mm to 0.4 mm) of the plug-in card, and major performance indicators of the plug-in card are tested. The performance indicators may include channel isolation>46 decibels (dB), channel isolation between plug-in cards>46 dB, insertion loss<0.32 dB, and return loss>15 dB. During the test, a maximum gap 0.4 mm is chosen as the gap between the plug-in card and the backplane, and a maximum deviation value, namely, 0.4 mm, is taken as a mounting position deviation X of the plug-in card and a mounting position deviation Y of the plug-in card, to perform a simulated test on performance in a maximum deviation. The test can cover all possible position deviation cases during plugging and unplugging. Test data is shown in Table 1 below.

TABLE 1

| Gap (mm) | dx1 (mm) | dx2 (mm) | dy1 (mm) | dy2 (mm) | Isolation inside the plug-in card (dB) | Isolation between the plug-in cards (dB) | Insertion loss (dB) | Return loss (dB) |
|---|---|---|---|---|---|---|---|---|
| 0 | 0 | 0 | 0 | 0 | 72 | 73 | 0.26 | >15 |
| 0.6/0 | 0 | 0 | 0 | 0 | 61 | 63 | 0.28 | >15 |
| 0.6 | 0 | 0 | 0 | 0 | 50 | 54 | 0.30 | >15 |
|  | −0.4 | 0.4 | 0 | 0 | 49 | 50 | 0.25 | >15 |
|  | 0.1 | −0.1 | 0 | 0 | 51 | 52 | 0.32 | >15 |
|  | 0.4 | 0.4 | 0 | 0 | 52 | 54 | 0.28 | >15 |
|  | 0 | 0 | −0.4 | 0.4 | 46 | 46 | 0.23 | >15 |
|  | 0 | 0 | 0.4 | 0.4 | 48 | 49 | 0.24 | >15 |

In Table 1, the gap indicates a gap value between the plug-in card and the backplane, dx1 indicates a deviation of a plug-in card 1 in an X direction, dx2 indicates a deviation of a plug-in card 2 in the X direction, dy1 indicates a deviation of the plug-in card 1 in a Y direction, dy2 indicates a deviation of the plug-in card 2 in the Y direction, isolation inside the plug-in card represents isolation between two waveguide blind-mate interfaces inside a same plug-in card, and isolation between the plug-in cards represents isolation between two waveguide blind-mate interfaces of two adjacent plug-in cards. Therefore, a conclusion is that the waveguide blind-mate design used in this application meets the electrical performance requirements for the connection between the plug-in card and the backplane.

In addition, a thermal simulation result of the signal transceiver apparatus in this embodiment can also meet a requirement. When heat consumption of the signal transceiver apparatus is about 700 watts and heat consumption of each plug-in card is about 15 watts, a temperature of the plug-in card is about 90.7 degrees Celsius (° C.) and a temperature of the key component PA is about 96.5° C., thereby also meeting a reliability design requirement of the signal transceiver apparatus.

Figure 34:
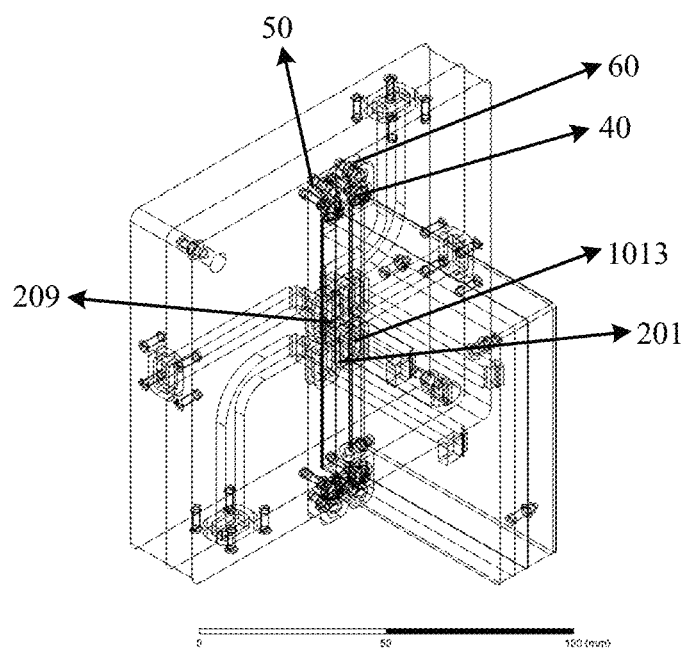
FIG. 34 is a schematic diagram of blind-mate assembly of a backplane and a plug-in card according to an embodiment of this application.

The following further describes an assembly manner of the signal transceiver apparatus in this application. FIG. 34 is a schematic diagram of blind-mate assembly of the backplane and the plug-in card according to an embodiment of this application. As shown in the figure, the plug-in card is assembled from a waveguide board and a multi-layer circuit board. The plug-in card is connected to the backplane using the first waveguide interface 1013 and the second waveguide interface 201 (as shown in FIG. 34). The first waveguide interface 1013 (a plug-in card rectangular waveguide interface of a unit on the right in FIG. 34) is directly disposed, in a mechanical processing manner, on the waveguide board of the plug-in card. The backplane is similarly assembled from a waveguide board and a backplane multi-layer circuit board, where the waveguide board is also a shielding component of the backplane multi-layer circuit board, and a waveguide interface is formed, in a mechanical processing manner, on the shielding waveguide board. An assembly relationship between the plug-in card and the backplane is shown on the left in FIG. 34. A pin hole 40 of the plug-in card is aligned to and mates with a pin 50 on the backplane, and the plug-in card is fixed onto the backplane using plug-in card fixing screws 60 that are on two sides of the plug-in card. The rectangular waveguide interface itself is not disposed with a flange or a fixing screw. Instead, a waveguide choke groove 209 is disposed on a periphery of a rectangular waveguide interface of the backplane. A structure of the waveguide choke groove 209 is shown in FIG. 34, which is a choke groove around the rectangular waveguide interface. A distance between the waveguide choke groove and the waveguide interface and a depth of the waveguide choke groove are about one-quarter wavelength (about 2.7 mm for a 28 GHz frequency band). The waveguide choke groove 209 is also directly disposed, in a mechanical processing manner, on the metallic shielding waveguide board of the backplane. An error tolerance function provided by the waveguide choke groove 209 is compatible with an assembly error during waveguide interface alignment, ensuring that electrical performance, such as a standing wave, an insertion loss, and isolation, meets the requirements and ensuring that radio frequency signal connection is reliable. The waveguide blind-mate interface is obtained by performing mechanical processing on an existing waveguide board, and no extra component is added. This is more economical, and interconnection costs are much lower.

What is claimed is:
1. A signal transceiver apparatus, comprising:
a plug-in card comprising:
two waveguide boards comprising waveguide slots positioned on a side of each of the two waveguide boards;
a multi-layer circuit board disposed between the two waveguide boards, wherein the multi-layer circuit board comprises metal layers positioned on each of two sides of the multi-layer circuit board, wherein a position of the metal layers and a position of the waveguide slots match to form two waveguide channels, wherein the two waveguide channels are respectively located on two sides of the multi-layer circuit board, and wherein the waveguide slots are positioned on a side of the two waveguide boards that faces the multi-layer circuit board;
an antenna array mounted on each of the two waveguide boards, wherein the two waveguide channels are each coupled to the antenna array;

a first waveguide interface mounted on each of the two waveguide boards, wherein the two waveguide channels are each coupled to the first waveguide interface; and a backplane comprising a second waveguide interface, wherein a waveguide connection between the plug-in card and the backplane is implemented through an interconnection between the first waveguide interface and the second waveguide interface.

2. The signal transceiver apparatus of claim 1, further comprising a punched hole disposed on the multi-layer circuit board, wherein the punched hole couples the two waveguide channels located on the two sides of the multi-layer circuit board.

3. The signal transceiver apparatus of claim 1, further comprising a cross groove provided at the metal layer of the multi-layer circuit board, wherein the cross groove passes through the metal layer on the two sides of the multi-layer circuit board.

4. The signal transceiver apparatus of claim 1, wherein the plug-in card further comprises a front-end circuit disposed on the multi-layer circuit board, and wherein the front-end circuit is coupled to the antenna array using the two waveguide channels and is configured to amplify a radio frequency signal received or transmitted by the antenna array.

5. The signal transceiver apparatus of claim 4, wherein the front-end circuit comprises:
a low-noise amplifier (LNA) configured to perform low-noise amplification on the radio frequency signal received by the antenna array; and
a power amplifier (PA) configured to:
perform power amplification on the radio frequency signal; and
send the radio frequency signal on which power amplification is performed to the antenna array.

6. The signal transceiver apparatus of claim 4, wherein the multi-layer circuit board further comprises a grounding plane, wherein the two waveguide boards are coupled to the grounding plane, and wherein the two waveguide boards are configured to shield the front-end circuit from an interference signal.

7. The signal transceiver apparatus of claim 4, wherein the multi-layer circuit board further comprise:
a pad coupled to the front-end circuit;
a heat conduction via coupled to the pad,
wherein the pad is coupled to a first waveguide board of the two waveguide boards using the heat conduction via.

8. The signal transceiver apparatus of claim 4, wherein the front-end circuit is coupled to the two waveguide channels using a waveguide conversion section.

9. The signal transceiver apparatus of claim 1, wherein the antenna array comprises two antenna sub-arrays mounted between the two waveguide boards and corresponding to the two waveguide channels.

10. The signal transceiver apparatus of claim 9, wherein a first antenna sub-array of the two antenna sub-arrays is coupled to a first waveguide channel of the two waveguide channels formed between a first waveguide board of the two waveguide boards and the multi-layer circuit board, and wherein a second antenna sub-array of the two antenna sub-array is coupled to a second waveguide channel of the two waveguide channels formed between a second waveguide board of the two waveguide boards and the multi-layer circuit board.

11. The signal transceiver apparatus of claim 1, wherein the first waveguide interface comprises two groups of waveguide interfaces, wherein a first group of waveguide interfaces of the first waveguide interface is disposed between a first waveguide board of the two waveguide boards and the multi-layer circuit board, and wherein a second group of waveguide interfaces of the first waveguide interface is disposed between a second waveguide board of the two waveguide boards and the multi-layer circuit board.

12. The signal transceiver apparatus of claim 1, wherein the first waveguide interface and the second waveguide interface form a rectangular waveguide.

13. The signal transceiver apparatus of claim 1, wherein the first waveguide interface and the second waveguide interface form a double-ridge waveguide.

14. The signal transceiver apparatus of claim 1, wherein the first waveguide interface and the second waveguide interface form a single-ridge waveguide.

15. The signal transceiver apparatus of claim 14, wherein the backplane further comprises a waveguide choke groove disposed on a periphery of the second waveguide interface.

16. The signal transceiver apparatus of claim 1, wherein the backplane further comprises:
a radio frequency circuit comprising a first end and a second end, wherein the second end is coupled to the plug-in card, and wherein the radio frequency circuit is configured to:
perform down-conversion domain processing on a radio frequency signal to obtain an analog intermediate frequency signal; or
perform up-conversion processing on the analog intermediate frequency signal to obtain the radio frequency signal; and
a digital intermediate frequency processor coupled to the first end of the radio frequency circuit and configured to:
convert the analog intermediate frequency signal into a digital intermediate frequency signal; or
convert the digital intermediate frequency signal into the analog intermediate frequency signal.

17. The signal transceiver apparatus of claim 1, wherein the backplane further comprises:
a backplane multi-layer circuit board configured to allow a digital intermediate frequency processor and a radio frequency circuit to be disposed thereon;
a shielding cover disposed on a first surface of the backplane multi-layer circuit board and configured to perform interference signal shielding; and
a heat dissipation device disposed on a second surface of the backplane multi-layer circuit board, wherein the first surface and the second surface are opposite surfaces, and wherein the heat dissipation device is configured to dissipate heat of the backplane multi-layer circuit board.

18. A base station, comprising:
a signal transceiver apparatus comprising:
a plug-in card comprising:
two waveguide boards comprising waveguide slots positioned on a side of each of the two waveguide boards;
a multilayer circuit board disposed between the two waveguide boards, wherein the multi-layer circuit board comprises metal layers positioned on each of two sides of the multi-layer circuit board, wherein a position of the metal layers and a position of the waveguide slots match to form waveguide channels, wherein the two waveguide channels are respectively located on two sides of the multi-layer circuit board, and wherein the waveguide slots are positioned on a side of the two waveguide boards that face the multi-layer circuit board;

an antenna array mounted on each of the two waveguide boards, wherein the two waveguide channels are each coupled to the antenna array; and a first waveguide interface mounted on each of the two waveguide boards, wherein the two waveguide channels are each coupled to the first waveguide interface; and a backplane comprising a second waveguide interface, wherein a waveguide connection between the plug-in card and the backplane is implemented through an interconnection between the first waveguide interface and the second waveguide interface.

19. The base station of claim 18, wherein a punched hole is disposed on the multi-layer circuit board, and wherein the punched hole couples the two waveguide channels located on the two sides of the multi-layer circuit board.

20. The base station of claim 18, wherein a cross groove provided at the metal layer of the multi-layer circuit board, and wherein the cross groove passes through the metal layer on the two sides of the multi-layer circuit board.

* * * * *

UNITED STATES PATENT AND TRADEMARK OFFICE
CERTIFICATE OF CORRECTION

PATENT NO. : 11,329,686 B2
APPLICATION NO. : 15/931231
DATED : May 10, 2022
INVENTOR(S) : Xue et al.

It is certified that error appears in the above-identified patent and that said Letters Patent is hereby corrected as shown below:

In the Claims

Claim 18, Column 24, Lines 64-65: "to form waveguide channels," should read "to form two waveguide channels,"

Signed and Sealed this
Twelfth Day of July, 2022

Katherine Kelly Vidal
*Director of the United States Patent and Trademark Office*